(12) United States Patent
Wang et al.

(10) Patent No.: US 11,287,271 B2
(45) Date of Patent: Mar. 29, 2022

(54) SYSTEMS AND METHODS FOR VEHICLE SHARING SERVICE

(71) Applicant: BEIJING QISHENG SCIENCE AND TECHNOLOGY CO., LTD., Beijing (CN)

(72) Inventors: Zhuangzhi Wang, Beijing (CN); Zhifeng Hu, Beijing (CN); Wei Duan, Beijing (CN)

(73) Assignee: BEIJING QISHENG SCIENCE AND TECHNOLOGY CO., LTD., Beijing (CN)

( * ) Notice: Subject to any disclaimer, the term of this patent is extended or adjusted under 35 U.S.C. 154(b) by 413 days.

(21) Appl. No.: 16/533,926

(22) Filed: Aug. 7, 2019

(65) Prior Publication Data

US 2019/0360825 A1    Nov. 28, 2019

Related U.S. Application Data

(63) Continuation of application No. PCT/CN2018/073926, filed on Jan. 24, 2018.

(30) Foreign Application Priority Data

Feb. 10, 2017 (CN) .......................... 201710074192.4
Feb. 15, 2017 (CN) .......................... 201710080959.4

(51) Int. Cl.
*H04W 4/024* (2018.01)
*H04W 4/80* (2018.01)
(Continued)

(52) U.S. Cl.
CPC .......... *G01C 21/3415* (2013.01); *G01S 11/06* (2013.01); *G01S 19/51* (2013.01);
(Continued)

(58) Field of Classification Search
CPC ..... G01C 21/3415; G01S 11/06; G01S 19/51; H04W 4/024; H04W 4/40; H04W 4/80;
(Continued)

(56) References Cited

U.S. PATENT DOCUMENTS

2013/0103200 A1    4/2013  Tucker et al.
2014/0266588 A1    9/2014  Majzoobi
(Continued)

FOREIGN PATENT DOCUMENTS

CN     102854491 A    1/2013
CN     104021696 A    9/2014
(Continued)

OTHER PUBLICATIONS

First Examination Report in Australian Patent Application No. 2018217542 dated Apr. 29, 2020, 7 pages.
(Continued)

*Primary Examiner* — Peter D Nolan
*Assistant Examiner* — Ashley L Redhead, Jr.
(74) *Attorney, Agent, or Firm* — Metis IP LLC

(57) ABSTRACT

A method for vehicle sharing service may include obtaining, from a terminal device, a location of the terminal device via a network. The method may also include obtaining, from the terminal device, information associated with a vehicle, the information including an identifier of a short-range wireless communication module of the vehicle. The short-range wireless communication module may emit a short-range wireless signal. The information associated with the vehicle may further include an intensity of the short-range wireless signal determined by the terminal device. The method may further include determining a location area of the vehicle based on the location of the terminal device and the intensity of the short-range wireless signal.

20 Claims, 12 Drawing Sheets

(51) Int. Cl.
   *H04W 4/40* (2018.01)
   *G01C 21/34* (2006.01)
   *G01S 11/06* (2006.01)
   *G01S 19/51* (2010.01)
   *B60R 25/24* (2013.01)

(52) U.S. Cl.
   CPC .............. *H04W 4/024* (2018.02); *H04W 4/40* (2018.02); *H04W 4/80* (2018.02); *B60R 25/245* (2013.01)

(58) Field of Classification Search
   CPC ...... H04W 4/029; H04W 4/02; B60R 25/245; G06Q 20/127; G06Q 20/308; G06Q 20/321; G06Q 20/3224; G06Q 20/327; G07F 17/0057
   See application file for complete search history.

(56) References Cited

U.S. PATENT DOCUMENTS

| | | | |
|---|---|---|---|
| 2016/0275794 A1 | 9/2016 | Chang | |
| 2017/0048680 A1* | 2/2017 | Chuang | .............. H04W 64/003 |
| 2018/0164106 A1* | 6/2018 | Peterson | .............. G05D 1/0276 |

FOREIGN PATENT DOCUMENTS

| | | | |
|---|---|---|---|
| CN | 104092483 A | 10/2014 | |
| CN | 104100152 A | 10/2014 | |
| CN | 104316044 A | 1/2015 | |
| CN | 104635703 A | 5/2015 | |
| CN | 104853050 A | 8/2015 | |
| CN | 105228108 A | 1/2016 | |
| CN | 106430746 A | 3/2016 | |
| CN | 105469634 A | 4/2016 | |
| CN | 105509747 A | 4/2016 | |
| CN | 105545123 A | 5/2016 | |
| CN | 105898706 A | 8/2016 | |
| CN | 106131772 A | 11/2016 | |
| CN | 106303958 A | 1/2017 | |
| CN | 106327911 A | 1/2017 | |
| CN | 106341792 A | 1/2017 | |
| CN | 106658414 A | 5/2017 | |
| CN | 106790685 A | 5/2017 | |
| CN | 107182030 A | 9/2017 | |
| JP | H05313574 A | 11/1993 | |
| JP | 2012226587 A | 11/2012 | |
| JP | 5716514 B2 | 5/2015 | |
| JP | 2015210617 A | 11/2015 | |
| JP | 2016146043 A | 8/2016 | |
| KR | 20160139135 A | 12/2016 | |
| WO | 2011026656 A1 | 3/2011 | |
| WO | 2016093541 A1 | 6/2016 | |
| WO | 2017013304 A1 | 1/2017 | |

OTHER PUBLICATIONS

Notice of Reasons for Rejection in Japanese Application No. 2019-543294 dated August 3, 2021, 7 pages Notice of Reasons for Rejection in Japanese Application No. 2019-543294 dated Nov. 24, 2020, 5 Pages.

International Search Report in PCT/CN2018/073926 dated May 3, 2018, 3 pages.

Written Opinion in PCT/CN2018/073926 dated May 3, 2018, 5 pages.

First Office Action in Chinese Application No. 201710080959.4 dated May 10, 2018, 16 pages.

First Office Action in Chinese Application No. 201710074192.4 dated May 28, 2018, 12 pages.

The Extended European Search Report in European Application No. 18751118.3 dated Sep. 6, 2019, 8 pages.

* cited by examiner

SYSTEMS AND METHODS FOR VEHICLE SHARING SERVICE

CROSS-REFERENCE TO RELATED APPLICATIONS

This application is a continuation of International Application No. PCT/CN2018/073926, filed on Jan. 24, 2018, which further claims priority to Chinese Application No. 201710080959.4, filed on Feb. 15, 2017, and Chinese Application No. 201710074192.4, filed on Feb. 10, 2017. The entire contents of these applications are incorporated herein by reference.

TECHNICAL FIELD

The present disclosure generally relates to systems and methods for on-demand service, and in particular, to systems and methods for vehicle sharing service.

BACKGROUND

On-demand services utilizing Internet technology, such as vehicle sharing services, have become increasingly popular because of their convenience. In the present vehicle sharing service, positioning technologies such as a global positioning system (GPS), a global navigation satellite system (GLONASS), or a BeiDou navigation system are often used to position the vehicle. However, these positioning technologies have low accuracy. It is desirable to provide systems and methods for positioning the vehicle with higher accuracy and more efficiency. In addition, it is needed to provide systems and methods for guiding a user to locate a vehicle more easily.

SUMMARY

According to an aspect of the present disclosure, a system may include a storage device storing a set of instructions and one or more processors in communication with the storage device. When executing the set of instructions, the one or more processors may be configured to cause the system to obtain, from a terminal device, a location of the terminal device via a network. The one or more processors may also be configured to cause the system to obtain, from the terminal device, information associated with a vehicle. The information may include an identifier of a short-range wireless communication module of the vehicle. The short-range wireless communication module may emit a short-range wireless signal. The information associated with the vehicle may further include an intensity of the short-range wireless signal determined by the terminal device. The one or more processors may further be configured to cause the system to determine a location area of the vehicle based on the location of the terminal device and the intensity of the short-range wireless signal.

In some embodiments, the one or more processors may be configured to cause the system to determine a distance between the vehicle and the terminal device based on the intensity of the short-range wireless signal determined by the terminal device. The one or more processors may further be configured to cause the system to determine the location area of the vehicle based on the location of the terminal device and the distance between the vehicle and the terminal device.

In some embodiments, the location area of the vehicle may be a circular region with the location of the terminal device as a center and the distance between the vehicle and the terminal device as a radius.

In some embodiments, the one or more processors may be configured to cause the system to mark the location area of the vehicle on a map. The one or more processors may further be configured to cause the system to obtain a request from a requester terminal. The one or more processors may further be configured to cause the system to obtain a location of the requester terminal. The one or more processors may further be configured to cause the system to mark the location of the requester terminal on the map. The one or more processors may further be configured to cause the system to transmit the map to the requester terminal.

The one or more processors may further be configured to cause the system to determine a plurality of location areas associated with a plurality of vehicles. The one or more processors may further be configured to cause the system to determine a hot region based on the plurality of location areas associated with the plurality of vehicles.

According to another aspect of the present disclosure, a system may include a storage device storing a set of instructions and one or more processors in communication with the storage device. When executing the set of instructions, the one or more processors may be configured to cause the system to obtain a location of the terminal device according to a first positioning mode. The one or more processors may further be configured to cause the system to determine a distance between a vehicle and the terminal device based on the determined location of the terminal device according to the first positioning mode. The one or more processors may further be configured to cause the system to determine whether the distance is greater than a first threshold. In response to the determination that the distance is greater than the first threshold, the one or more processors may be configured to cause the system to generate a first route between the terminal device and the vehicle, and transmit the first route to the terminal device. In response to the determination that the distance is not greater than the first threshold, the one or more processors may be configured to cause the system to generate, according to a second positioning mode, a second route between the terminal device and the vehicle, and transmit the second route to the terminal device.

In some embodiments, the positioning accuracy of the second positioning mode may be higher than that of the first positioning mode.

In some embodiments, the one or more processors may further be configured to cause the system to re-determine the distance between the vehicle and the terminal device based on the second positioning mode. The one or more processors may be further configured to cause the system to determine that the distance is less than a second threshold. The one or more processors may be further configured to cause the system to transmit an arrival hint to the terminal device. The second threshold may be less than the first threshold.

In some embodiments, the one or more processors may further be configured to cause the system to transmit an instruction to the vehicle to emit a reminding hint.

In some embodiments, the first positioning mode may be a position mode based on at least one of: a global positioning system (GPS), a global navigation satellite system (GLONASS), or a beidou navigation system.

In some embodiments, the second positioning mode may include an ibeacon positioning mode.

According to yet another aspect of the present disclosure, a terminal device may include a storage device storing a set of instructions and one or more processors in communication with the storage device. When executing the set of instructions, the one or more processors may be configured to cause the terminal device to determine a location of the terminal device. The one or more processors may further be configured to cause the terminal device to obtain a short-range wireless signal emitted from a short-range wireless communication module of a vehicle. The short-range wireless signal may include an identifier of the short-range wireless communication module of the vehicle. The one or more processors may further be configured to cause the terminal device to determine an intensity of the short-range wireless signal. The one or more processors may further be configured to cause the terminal device to determine a location area of the vehicle based on the location of the terminal device and the intensity of the short-range wireless signal.

In some embodiments, the one or more processors may further be configured to cause the terminal device to determine a distance between the vehicle and the terminal device based on the intensity of the short-range wireless signal. The one or more processors may further be configured to cause the terminal device to determine the location area of the vehicle based on the location of the terminal device and the distance between the vehicle and the terminal device.

In some embodiments, the location area of the vehicle may be a circular region with the location of the terminal device as a center and the distance between the vehicle and the terminal device as a radius.

According to yet another aspect of the present disclosure, a terminal device may include a storage device storing a set of instructions and one or more processors in communication with the storage device. When executing the set of instructions, the one or more processors may be configured to cause the terminal device to determine a location of the terminal device according to a first positioning mode. The one or more processors may further be configured to cause the terminal device to determine a distance between a vehicle and the terminal device based on the determined location of the terminal device according to the first positioning mode. The one or more processors may further be configured to cause the terminal device to determine whether the distance is greater than a first threshold. In response to the determination that the distance is greater than the first threshold, the one or more processors may be configured to cause the terminal device to generate a first route between the terminal device and the vehicle. In response to the determination that the distance is not greater than the first threshold, the one or more processors may be configured to cause the terminal device to generate, according to a second positioning mode, a second route between the terminal device and the vehicle.

In some embodiments, the positioning accuracy of the second positioning mode may be higher than that of the first positioning mode.

In some embodiments, the one or more processors may further be configured to cause the terminal device to re-determine the distance between the vehicle and the terminal device based on the second positioning mode. The one or more processors may further be configured to cause the terminal device to determine that the distance is less than a second threshold. The one or more processors may further be configured to cause the terminal device to generate an arrival hint, the second threshold being less than the first threshold.

In some embodiments, the one or more processors may further be configured to cause the terminal device to transmit an instruction to the vehicle to emit a reminding hint.

In some embodiments, the first positioning mode may be a position mode based on at least one of: a global positioning system (GPS), a global navigation satellite system (GLONASS), or a beidou navigation system.

In some embodiments, the second positioning mode may include an ibeacon positioning mode.

According to yet another aspect of the present disclosure, a method may be implemented on a computing device having at least one processor, at least one storage device, and a communication platform connected to a network. The method may include obtaining, from a terminal device, a location of the terminal device via a network. The method may also include obtaining, from the terminal device, information associated with a vehicle. The information may include an identifier of a short-range wireless communication module of the vehicle. The short-range wireless communication module may emit a short-range wireless signal. The information associated with the vehicle may further include an intensity of the short-range wireless signal determined by the terminal device. The method may also include determining a location area of the vehicle based on the location of the terminal device and the intensity of the short-range wireless signal.

According to yet another aspect of the present disclosure, a method may be implemented on a terminal device having at least one processor, at least one storage device. The method may include obtaining a location of the terminal device according to a first positioning mode. The method may also include determining a distance between a vehicle and the terminal device based on the determined location of the terminal device according to the first positioning mode. The method may also include determining whether the distance is greater than a first threshold. In response to the determination that the distance is greater than the first threshold, the method may include generating a first route between the terminal device and the vehicle. In response to the determination that the distance is not greater than the first threshold, the method may include generating, according to a second positioning mode, a second route between the terminal device and the vehicle.

According to yet another aspect of the present disclosure, a non-transitory computer-readable medium embodying a computer program product may include instructions configured to cause a computing device to obtain, from a terminal device, a location of the terminal device via a network. The instructions may also be configured to cause the computing device to obtain, from the terminal device, information associated with a vehicle. The information may include an identifier of a short-range wireless communication module of the vehicle. The short-range wireless communication module may emit a short-range wireless signal. The information associated with the vehicle may further include an intensity of the short-range wireless signal determined by the terminal device. The instructions may also be configured to cause the computing device to determine a location area of the vehicle based on the location of the terminal device and the intensity of the short-range ireless signal.

According to yet another aspect of the present disclosure, a non-transitory computer-readable medium embodying a computer program product may include instructions configured to cause a computing device to obtain a location of the terminal device according to a first positioning mode. The instructions may also be configured to cause the computing device to determine a distance between a vehicle and the terminal device based on the determined location of the terminal device according to the first positioning mode. The instructions may also be configured to cause the computing device to determine whether the distance is greater than a first threshold. In response to the determination that the distance is greater than the first threshold, the instructions may be configured to cause the computing device to generate a first route between the terminal device and the vehicle, and transmit the first route to the terminal device. In response to the determination that the distance is not greater than the first threshold, the instructions may be configured to cause the computing device to generate, according to a second positioning mode, a second route between the terminal device and the vehicle, and transmit the second route to the terminal device.

According to yet another aspect of the present disclosure, a system for vehicle sharing service may include an acquisition module configured to obtain, from a terminal device, a location of the terminal device via a network. The acquisition module may further be configured to obtain, from the terminal device, information associated with a vehicle. The information may include an identifier of a short-range wireless communication module of the vehicle. The short-range wireless communication module may emit a short-range wireless signal. The information associated with the vehicle may further include an intensity of the short-range wireless signal determined by the terminal device. The system may also include a processing module configured to determine a location area of the vehicle based on the location of the terminal device and the intensity of the short-range wireless signal.

In some embodiments, the processing module may be configured to determine a distance between the vehicle and the terminal device based on the intensity of the short-range wireless signal determined by the terminal device. The processing module may further be configured to determine the location area of the vehicle based on the location of the terminal device and the distance between the vehicle and the terminal device.

In some embodiments, the location area of the vehicle may be a circular region with the location of the terminal device as a center and the distance between the vehicle and the terminal device as a radius.

In some embodiments, the processing module may further be configured to determine a plurality of location areas associated with a plurality of vehicles. The processing module may further be configured to determine a hot region based on the plurality of location areas associated with the plurality of vehicles.

According to yet another aspect of the present disclosure, a terminal device may include a positioning module configured to determine a location of the terminal device according to a first positioning mode. The terminal device may also include a processing module configured to determine a distance between a vehicle and the terminal device based on the determined location of the terminal device according to the first positioning mode. The processing module may further be configured to determine whether the distance is greater than a first threshold. In response to the determination that the distance is greater than the first threshold, the processing module may generate a first route between the terminal device and the vehicle. In response to the determination that the distance is not greater than the first threshold, the processing module may generate, according to a second positioning mode, a second route between the terminal device and the vehicle.

In some embodiments, the positioning accuracy of the second positioning mode may be higher than that of the first positioning mode.

In some embodiments, the processing module may further be configured to re-determine the distance between the vehicle and the terminal device based on the second positioning mode. The processing module may further be configured to determine that the distance is less than a second threshold. The second threshold may be less than the first threshold. The terminal device may further include a reminding module configured to generate an arrival hint.

In some embodiments, the terminal device may further include a communication module configured to transmit an instruction to the vehicle to emit a reminding hint.

In some embodiments, the first positioning mode may be a position mode based on at least one of: a global positioning system (GPS), a global navigation satellite system (GLONASS), or a beidou navigation system.

In some embodiments, the second positioning mode may include an ibeacon positioning mode.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
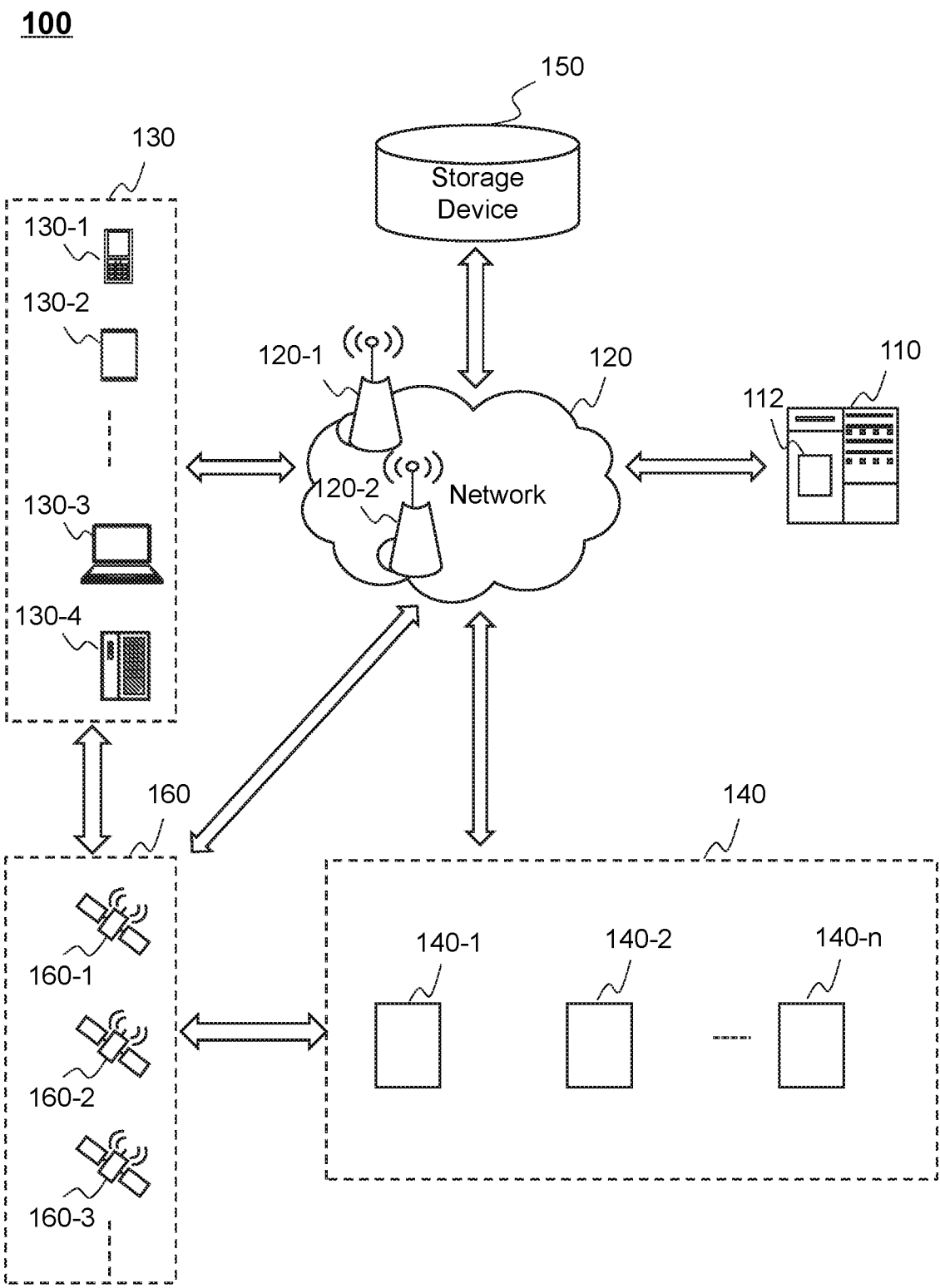
FIG. 1 is a schematic diagram illustrating an exemplary vehicle sharing system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is to describe particular exemplary embodiments only and is not intended to be limiting. As used herein, the singular forms "a," "an," and "the" may be intended to include the plural forms as well, unless the context expressly indicates otherwise. It will be further understood that the terms "comprise," "comprises," and/or "comprising," "include," "includes," and/or "including," when used in the present disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for the purpose of illustration and description only and are not intended to limit the scope of the present disclosure. It is understood that the drawings are not to scale.

It will be understood that the term "system," "engine," "unit," and/or "module" used herein are one method to distinguish different components, elements, parts, sections, or assemblies of different levels in ascending order. However, the terms may be displaced by other expressions if they achieve the same purpose.

It will be understood that when a unit, engine, or module is referred to as being "on," "connected to," or "coupled to," another unit, engine, or module, it may be directly on, connected or coupled to, or communicate with the other unit, engine, or module, or an intervening unit, engine, or module may be present, unless the context clearly indicates otherwise. As used herein, the term "and/or" includes any and all combinations of one or more of the associated listed items.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods described in the present disclosure are described primarily regarding a vehicle sharing service, it should also be understood that they are merely exemplary embodiments. The systems or methods described in the present disclosure may apply to any other kind of economic sharing service that transfers a usufruct from one to another in an online rental transaction. For example, the systems or methods of the present disclosure may apply to physical asset renting and/or a labor service. The physical asset may include real estate (e.g., a hotel, a room, or an apartment), vehicles (e.g., a car, a bicycle, an electric bicycle, a bus, a hot-air balloon, or an airplane), goods (e.g., clothes, an umbrella, a charger, or a microphone), etc. The labor service may include pet adoption, housekeeping, designated driving, etc. The application of the systems or methods of the present disclosure may include a web page, a plug-in for a browser, a client terminal, a custom system, an internal analysis system, an artificial intelligence robot, or the like, or any combination thereof.

The terms "cyclist," "requestor," "service requestor," "cyclist terminal," "requestor terminal," "terminal device," and "user" in the present disclosure are used interchangeably to refer to an individual, an entity, or a tool that may request or order a vehicle sharing service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

It should be noted that the vehicle sharing service is a new form of service rooted only in post-Internet era. It provides technical solutions to users and service providers that could raise only in the post-Internet era. In the pre-Internet era, when a user needs to rent a vehicle in a vehicle rental shop, the vehicle request and acceptance occur only between the user and a shopkeeper of the vehicle rental shop who meet each other at a physical place. Through the Internet (and/or other types of network technology like Bluetooth), the vehicle sharing service, however, allows a user of the service to acquire a location of a vehicle accurately and rent a vehicle anywhere and anytime. It also allows the user to park the vehicle in any area where the parking of the vehicle is allowed. Therefore, through the Internet, a vehicle sharing system may provide a more convenient transaction platform for users and service providers that may never meet in the settings of the traditional, pre-Internet vehicle service.

The present disclosure relates to systems and methods for vehicle sharing service. The systems and methods may determine a location area of a vehicle based on a location of a terminal device and an intensity of the short-range wireless signal that the terminal device detects. The location area of the vehicle may be a circular region with the location of the terminal device as a center and the distance between the vehicle and the terminal device as a radius. The systems and methods may further guide a user to locate a vehicle according to a first positioning mode and a second positioning mode. The positioning accuracy of the second positioning mode may be higher than that of the first positioning mode. Therefore, with a help of the terminal device, the systems and methods may position the vehicle accurately and inexpensively. In addition, the process of the user to locate the vehicle may be more convenient by a combination of the first positioning mode and the second positioning mode.

FIG. 1 is a schematic diagram illustrating an exemplary vehicle sharing system 100 according to some embodiments of the present disclosure. The vehicle sharing system 100 may include a server 110, a network 120, one or more terminal devices 130, one or more vehicles 140, a storage 150, and a positioning device 160. The vehicle sharing system 100 may provide a vehicle sharing service allowing a user to use a vehicle (e.g., the vehicle 140) for a ride. When the user finishes the ride and wants to return the vehicle 140, the user may leave the vehicle 140 in any area where the parking of the vehicle 140 is allowed. The vehicle 140 may then be ready for a next user.

The server 110 may communicate with the terminal device 130 and/or the vehicle 140 to provide various functionalities of the vehicle sharing service. For example, the server 110 may receive a service request from the terminal device 130 via, for example, the network 120. The service request may include order information relating to the ride and/or the vehicle 140, including, for example, a vehicle type, a departing place, a destination, mileage, a route, or the like, or any combination thereof. The service request may also include the information relating the user (e.g., the user account information) and/or the terminal device 130 (e.g., the location of the terminal device 130).

The server 110 may also transmit information to the terminal device 130 and/or the vehicle 140. For instance, the server 110 may determine one or more vehicles 140 in response to the service order received from the terminal device 130 and transmit the information relating to the one or more vehicles 140 to the terminal device 130, including, for example, the locations of the one or more vehicles 140, the fees for the ride (e.g., the total fees for the ride, the hourly rate for the ride), or the like, or a combination thereof. The server 110 may also transmit an instruction to lock a vehicle 140, an instruction to unlock the vehicle 140, the information indicating that the vehicle 140 is out of range, navigation information, etc.

The server 110 may determine a hotspot area based on historical data obtained from the terminal device 130, the vehicle 140, and/or the storage 150. The hotspot area may be an area where vehicles are in high demand. The historical data may include the number of searches for a vehicle in an area. The historical data may also include data relating to historical service orders (e.g. the number of times that the vehicles 140 have been used in an area). The historical data may further include information provided by users via the terminal devices 130 (e.g., advice to place more vehicles in some area submitted by users). The server 110 may also provide a service fee management. The server 110 may determine the cost of a ride based on a monthly membership, a quarterly membership, a season (e.g., spring, summer) membership, an annual membership, or fees per ride.

In some embodiments, the server 110 may be a single server or a server group. The server group may be a centralized server group connected to the network 120 via an access point or a distributed server group connected to the network 120 via one or more access points, respectively. In some embodiments, the server 110 may be locally connected to the network 120 or in remote connection with the network 120. For example, the server 110 may access information and/or data stored in the terminal device 130, the vehicle 140, and/or the storage 150 via the network 120. As another example, the storage 150 may serve as backend data storage of the server 110. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 110 may include a processing device 112. The processing device 112 may process information and/or data related to performing one or more functions in the present disclosure. For example, the processing device 112 may determine a location area of a vehicle 140. In some embodiments, the processing device 112 may include one or more processing units (e.g., single-core processing engine(s) or multi-core processing engine(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the vehicle sharing system 100 (e.g., the server 110, the terminal device 130, the vehicle 140, or the storage 150) may transmit information and/or data to another component(s) in the vehicle sharing system 100 via the network 120. For example, the server 110 may access and/or obtain data of a plurality of vehicles 140 from the storage 150 via the network 120. For example, the server 110 may transmit the distribution of vehicles 140 near the location of the terminal device 130 to the terminal device 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the vehicle sharing system 100 may be connected to the network 120 to exchange data and/or information.

In some embodiments, a user may be an owner of the terminal device 130. The terminal device 130 may receive input from the user and transmit the information relating to the input to the server 110 via the network 120. The terminal device 130 may also receive information from the server 110 via the network 120. For example, the terminal device 130 may receive input from the user relating to a service request for a vehicle to the server 110, receive a service confirmation, and/or information or instructions from the server 110. Merely by way of example, the terminal device 130 may be configured to transmit a service request to the server 110 for searching for vehicles 140 near the location of the terminal device 130. The server 110 may determine one or more vehicles 140 (e.g., the locations of the vehicles 140, number of the vehicles 140) near the location of the terminal device 130 according to and in response to the service request. The server 110 may also transmit information relating to the determined one or more vehicles 140 to the terminal device 130 via the network 120. The information of the determined one or more vehicles 140 may be displayed on the terminal device 130 associated with an electronic map. The terminal device 130 may receive input from the user indicating a selected vehicle 140 from the vehicles 140 displayed on the terminal device 130, which may be transmitted to the server 110. The terminal device 130 may also provide a walking navigation for guiding the user to the location of the selected vehicle 140. As another example, the terminal device 130 may receive input from the user for reserving a vehicle 140 and transmit the information to the server 110. As yet another example, the terminal device 130 may transmit feedback information provided by the user to the server 110. The feedback information may include the status of the vehicle 140 (e.g., whether any part of the vehicle 140 needs to be repaired), improvement suggestions, etc.

In some embodiments, the terminal device 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include a built-in computer, a built-in onboard television, a built-in tablet, etc. In some embodiments, the terminal device 130 may include a signal transmitter and a signal receiver configured to communicate with the positioning device 160 for locating the position of the user and/or the terminal device 130.

The vehicle 140 may include a plurality of vehicles 140-1, 140-2, . . . , 140-n. The vehicle 140 may be any type of vehicle including, for example, a unicycle, a bicycle, a tricycle, a tandem, a motor bicycle, an electric bicycle, a moped, etc. The color of a vehicle 140 is not limiting. Merely by way of example, the color of the body of the vehicle 140 may be yellow. In some embodiments, a vehicle 140 may be identified with a unique symbol. The unique symbol may include a bar code, a quick response (QR) code, a serial number including letters and/or digits, or the like, or any combination thereof. For example, the identification (ID) of the vehicle 140 may be obtained by scanning the QR code of the vehicle 140 through a mobile application of the terminal device 130. The vehicle 140 may communicate with the server 110, the network 120, the terminal device 130, and/or the positioning device 160. For example, the vehicle 140 may transmit status information of the vehicle 140 to the server 110 via the network 120. The status information may include a location of the vehicle 140, a locked/unlocked status of the vehicle 140, a riding distance, a riding duration time, and/or a riding speed of the vehicle 140, battery power of the vehicle 140, or the like, or a combination thereof. The server 110 may monitor the vehicle 140 based on the status information. As another example, the vehicle 140 may receive an instruction (e.g., an instruction to lock/unlock the vehicle 140) from the terminal device 130 and/or the server 110. As yet another example, the vehicle 140 may include a signal transmitter and a signal receiver (e.g., a GPS component of the vehicle 140) configured to communicate with the positioning device 160 for locating a position of the vehicle 140.

The storage 150 may store data and/or instructions. The data may include data related to users, terminal devices 130, vehicles 140, etc. The data related to the users may include user profiles including for example, names of the users, mobile numbers of the users, ID numbers of the users, types of the users (e.g., annual card users, quarterly card users, or monthly card users), usage records of the users (e.g., riding time, cost), credit rating of the users, historical routes, account balance, etc. The data related to the vehicles 140 may include service conditions of the vehicles (an inactive state, a booking state, on a ride, in a maintenance state, in a loss state), positions of the vehicles, types of the vehicles (e.g., a unicycle, a bicycle, a tricycle, a tandem, a motor bicycle, an electric bicycle), etc. In some embodiments, the storage 150 may store data obtained from the terminal device 130 and/or the vehicle 140. For example, the storage 150 may store log information associated with the terminal device 130. In some embodiments, the storage 150 may store data and/or instructions that the server 110 may execute or use to perform exemplary methods described in the present disclosure.

In some embodiments, the storage 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The positioning device 160 may determine information associated with an object, for example, one or more of the terminal device 130, or the vehicle 140. For example, the positioning device 160 may determine a current time and a current location of the terminal device 130 and/or the vehicle 140. In some embodiments, the positioning device 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, and/or a current time. The location may be in the form of coordinates, such as a latitude coordinate and a longitude coordinate, etc. The positioning device 160 may include one or more satellites, for example, a satellite 160-1, a satellite 160-2, and a satellite 160-3. The satellite 160-1 through 160-3 may determine the information mentioned above independently or jointly. The positioning device 160 may transmit the information mentioned above to the terminal device 130, or the vehicle 140 via the network 120.

In some embodiments, one or more components of the vehicle sharing system 100 may access the data and/or instructions stored in the storage 150 via the network 120. In some embodiments, the storage 150 may be directly connected to the server 110 as a backend storage. In some embodiments, one or more components of the vehicle sharing system 100 (e.g., the server 110, the terminal device 130, or the vehicle 140) may have permissions to access the storage 150. In some embodiments, one or more components of the vehicle sharing system 100 may read and/or modify the information related to the user, and/or the vehicle 140 when one or more conditions are met. For example, the server 110 may read and/or modify one or more users' information after a ride of the vehicle 140 is completed.

In some embodiments, the information exchange between one or more components of the vehicle sharing system 100 may be initiated by way of launching the mobile application of the vehicle sharing service on a terminal device 130, requesting a vehicle service, or inputting a query via the terminal device 130 (e.g., searching for a vehicle). The object of the service request may be any product. In some embodiments, the product may include food, medicine, commodity, chemical product, electrical appliance, clothing, car, housing, luxury, or the like, or any combination thereof. In some other embodiments, the product may include a service product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistant (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc.

One of ordinary skill in the art would understand that when an element of the vehicle sharing system 100 performs, the element may perform through electrical signals and/or electromagnetic signals. For example, when a terminal device 130 processes a task, such as making a determination, unlocking a vehicle 140, the terminal device 130 may operate logic circuits in its processor to process such task. When the terminal device 130 transmits out a query (e.g., information relating to a location of a vehicle 140) to the server 110, a processor of the terminal device 130 may generate electrical signals encoding the query. The processor of the terminal device 130 may then transmit the electrical signals to an output port. If the terminal device 130 communicates with the server 110 via a wired network, the output port may be physically connected to a cable, which further transmits the electrical signal to an input port of the server 110. If the terminal device 130 communicates with the server 110 via a wireless network, the output port of the terminal device 130 may be one or more antennas, which convert the electrical signals to electromagnetic signals. Similarly, a vehicle 140 may process a task through operation of logic circuits in its processor, and receive an instruction and/or service order from the server 110 via electrical signals or electromagnet signals. Within an electronic device, such as the terminal device 130, the vehicle 140, and/or the server 110, when a processor thereof processes an instruction, transmits out an instruction, and/or performs an action, the instruction and/or action is conducted via electrical signals. For example, when the processor retrieves data (e.g., a plurality of user profiles) from a storage medium (e.g., the storage 150), it may transmit out electrical signals to a reading device of the storage medium, which may read structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
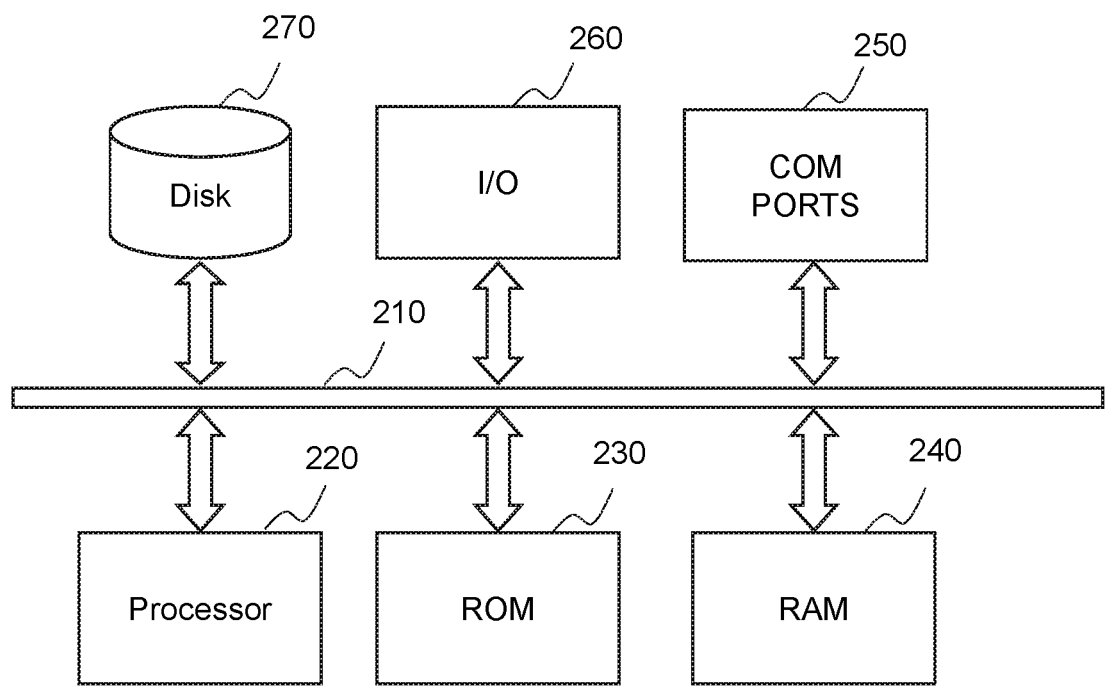
FIG. 2 is a schematic diagram illustrating exemplary hardware and/or software components of a computing device according to some embodiments of the present disclosure.

FIG. 2 is a schematic diagram illustrating exemplary hardware and/or software components of a computing device 200 according to some embodiments of the present disclosure. The computing device 200 may be a general purpose computer or a special purpose computer. The computing device 200 may be used to implement any component of the vehicle sharing system 100 as described herein. For example, the processing device 112 of the server 110, and/or the terminal device 130 may be implemented on the computing device 200, via its hardware, software program, firmware, or a combination thereof. Although only one such computer is shown for convenience, the computer functions related to the vehicle sharing service as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a processor 220 for executing program instructions to perform the functions of the server 110 described herein. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or another type of non-transitory storage medium to be executed by the processor 220. The methods and/or processes of the present disclosure may be implemented as the program instructions. The computing device 200 also includes an I/O 260, supporting input/output between the computer, the user, and other components therein. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 may execute both step A and step B. As in another example, step A and step B may also be performed by two different CPUs and/or processors jointly or separately in the computing device 200 (e.g., the first processor executes step A and the second processor executes step B, or the first and second processors jointly execute steps A and B).

Figure 3:
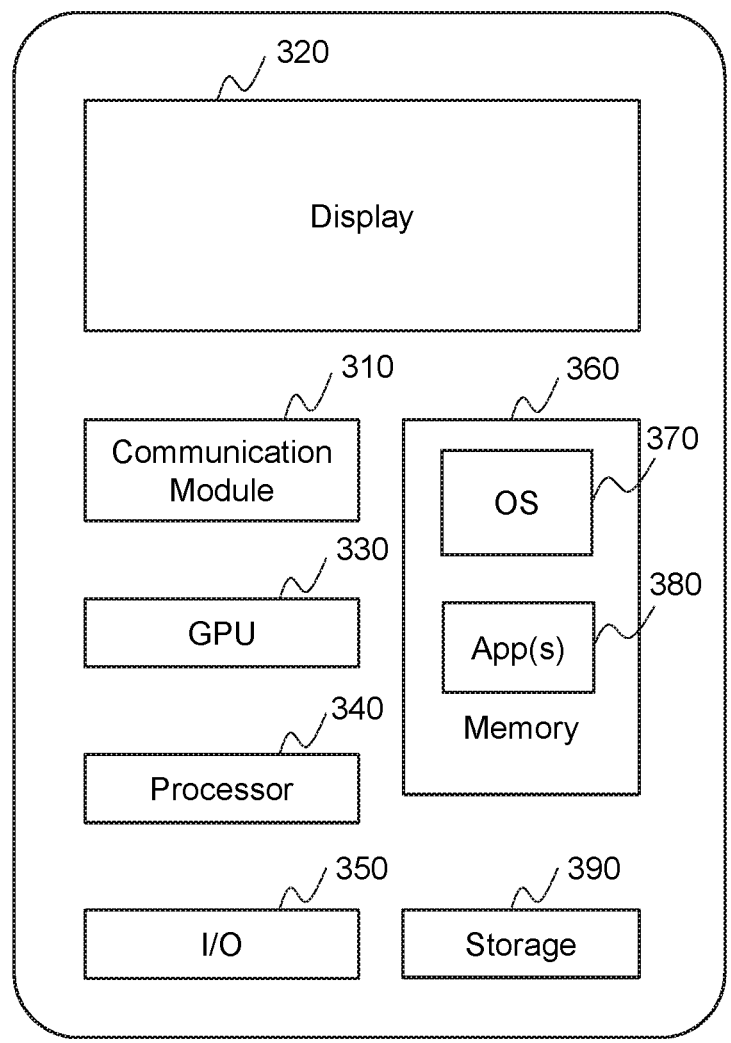
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. As illustrated in FIG. 3, the mobile device 300 may include a communication module 310, a display 320, a graphic processing unit (GPU) 330, a processor 340, an I/O 350, a memory 360, and a storage 390. In some embodiments, any other suitable component, including but not limited to a system bus or a controller (not shown), may be included in the mobile device 300. In some embodiments, a mobile operating system 370 (e.g., iOS™, Android™, Windows Phone™) and one or more applications 380 may be loaded into the memory 360 from the storage 390 in order to be executed by the processor 340. The applications 380 may include a browser or any other suitable apps for transmitting, receiving and presenting information relating to the status of the vehicle 140 (e.g., the location of the vehicle 140) from the server 110. User interactions with the information stream may be achieved via the I/O 350 and provided to the server 110 and/or other components of the vehicle sharing system 100 via the network 120.

Figure 4:
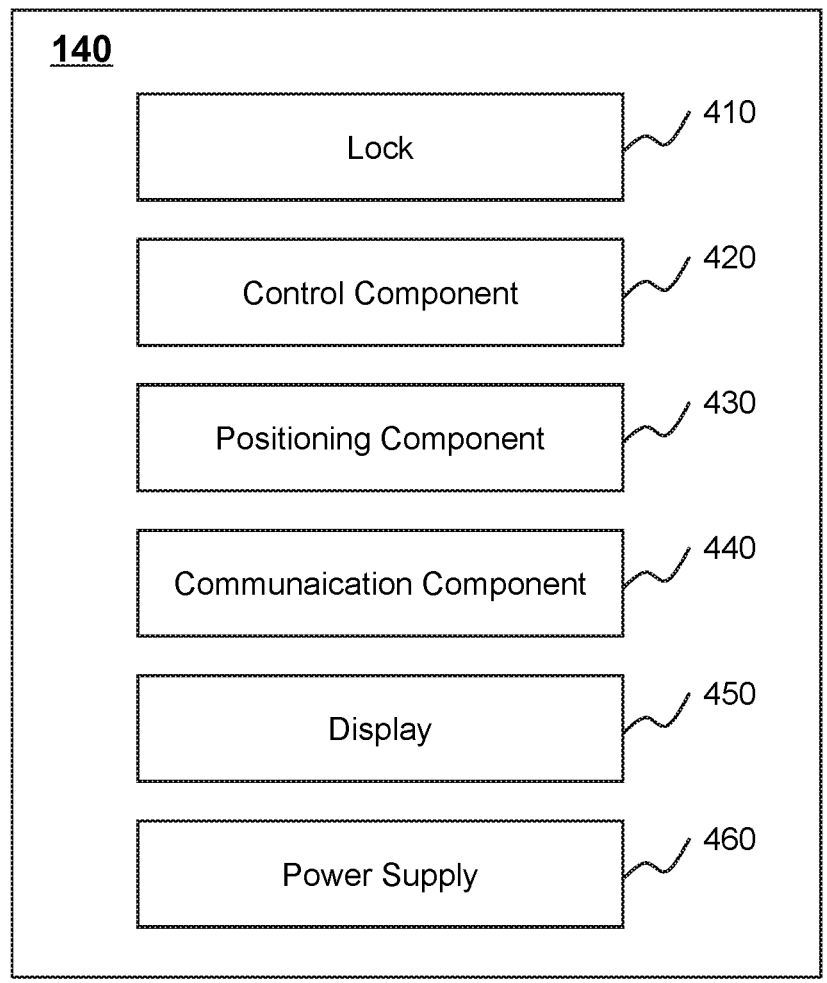
FIG. 4 is a schematic diagram illustrating exemplary hardware and/or software components of a vehicle according to some embodiments of the present disclosure.

FIG. 4 is a schematic diagram illustrating exemplary hardware and/or software components of a vehicle 140 according to some embodiments of the present disclosure. The vehicle 140 may include a lock 410, a control component 420, a positioning component 430, a communication component 440, a display 450, and a power supply 460.

The lock 410 may be configured to lock one or more wheels of the vehicle. In some embodiments, the lock 410 may be configured to secure the vehicle 140 to a fixed object such as a vehicle lock pillar or a rack. The lock 410 may include any combination of mechanisms to implement the function thereof. For example, the lock 410 may include a mechanical lock or an electronic lock.

The control component 420 may control operations of other components of the vehicle 140 (e.g., the lock 410, the positioning component 430, and/or the communication component 440). For example, the control component 420 may control the lock 410 to be opened (i.e., releasing the vehicle) and/or locked (i.e., locking the vehicle) in response to instructions from the server 110 and/or the terminal device 130.

The positioning component 430 may communicate with the positioning device 160 of the vehicle sharing system 100 for locating or tracking a position of the vehicle 140. The communication component 440 may facilitate communications among the vehicle 140, the terminal device 130, and/or the server 110.

The communication component 440 may utilize various wireless technologies such as a cellular communication technology (e.g., GSM, CDMA, 2G, 3G, 4G), a short range radio communication technology (e.g., Bluetooth, NFC, Zigbee, a wireless fidelity (Wi-Fi) technology, an infrared data association (IrDA) technology), narrow band internet of things (NB-IoT), lower-power wide-area network (LPWAN) (e.g., LoRa), etc. In some embodiments, the control component 420, the positioning component 430, and/or the communication component 440 may be integrated into the lock 410.

The display 450 may display information relating to the vehicle 140 when a user is riding the vehicle 140. The information may include a navigation map, a riding speed, a riding distance, etc. In some embodiments, the display 450 may also display advertisements, news, traffic, weather, etc. In some embodiments, the display 450 may provide an interactive interface for the user. For example, the user may select a navigation route from a plurality of routes shown on the display 450. The display 450 may include a liquid crystal display (LCD), a light emitting diode (LED)-based display, a flat panel display or curved screen, a television device, a cathode ray tube (CRT), or the like, or any combination thereof. In some embodiments, the display 450 may be integrated with the lock 410.

The power supply 460 may provide power for operations of components of the vehicle 140 (e.g., the control component 420, the positioning component 430, the communication component 440, the display 450). The power supply 460 may include a battery charged by solar energy, kinetic energy (e.g., during a ride of the vehicle 140, the battery may be charged), wind energy, mechanical energy, etc. In some embodiments, the vehicle 140 may include other components, for example, a moving component (e.g., a pedal, a wheel), a gearing component (e.g., a bicycle chain), an arresting component (e.g., a brake), an alarming component (e.g., a bell), or the like, or any combination thereof.

Figure 5:
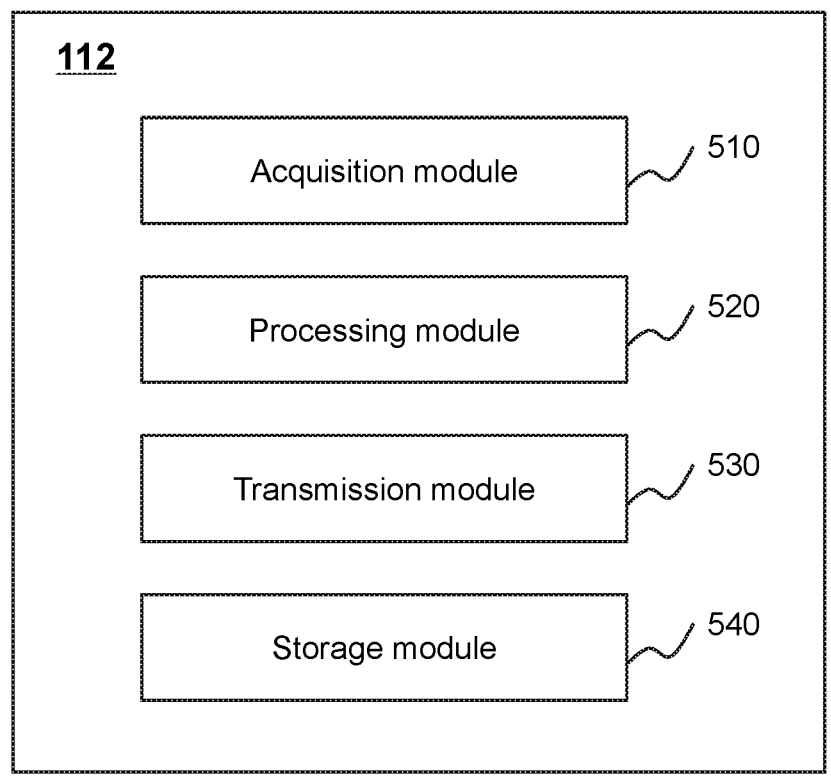
FIG. 5 is a schematic diagram illustrating an exemplary processing device according to some embodiments of the present disclosure.

FIG. 5 is a schematic diagram illustrating an exemplary processing device according to some embodiments of the present disclosure. The processing device 112 may include an acquisition module 510, a processing module 520, a transmission module 530, and a storage module 540.

The acquisition module 510 may be configured to obtain information relating to the vehicle sharing service. In some embodiments, the acquisition module 510 may obtain a vehicle usage request from a terminal device 130. The vehicle usage request may include a request that a user of the terminal device 130 wants to use a vehicle 140 in real time or in a preset time. In some embodiments, the acquisition module 510 may obtain a location of the terminal device 130. For example, the acquisition module 510 may obtain the location of the terminal device 130 according to a first positioning mode or a second positioning mode. In some embodiments, the acquisition module 510 may obtain information associated with the vehicle 140 from the terminal device 130. For example, the information may include an identifier of a short-range wireless communication module of the vehicle 140 and an intensity of the short-range wireless signal determined by the terminal device 130.

The processing module 520 may be configured to process the information relating to the vehicle sharing service. In some embodiments, the processing module 520 may determine a location area of the vehicle 140. In some embodiments, the processing module 520 may determine a distance (e.g., a straight-line distance or a route distance) between the vehicle 140 and the terminal device 130. For example, the processing module 520 may determine the distance based on an intensity of the short-range wireless signal. In some embodiments, the processing module 520 may mark the location area of the vehicle 140 on a map. The map may be stored in a storage device (e.g., the storage 150, the storage module 540). In some embodiments, the processing module 520 may mark the location of the terminal device 130 on the map. In some embodiments, the processing module 520 may determine a hot region based on a plurality of location areas associated with a plurality of vehicles. In some embodiments, the processing module 520 may determine whether the distance between the vehicle 140 and the terminal device 130 is greater than a threshold (e.g., a first threshold, a second threshold). In some embodiments, the processing module 520 may generate a route (e.g., a first route, a second route) between the terminal device 130 and the vehicle 140. For example, the processing module 520 may generate a second route between the terminal device 130 and the vehicle 140 according to a second positioning mode.

The transmission module 530 may be configured to transmit the information relating to the vehicle sharing service to a terminal device 130 and/or a vehicle 140. In some embodiments, the transmission module 530 may transmit a location area of the vehicle 140 to the terminal device 130. In some embodiments, the transmission module 530 may transmit a map, including the location area of the vehicle 140 and the location of the terminal device 130, to the terminal device 130. In some embodiments, the transmission module 530 may transmit a hot region to a user (e.g., the terminal device 130). In some embodiments, the transmission module 530 may transmit a route (e.g., a first route, a second route), from the terminal device 130 to the vehicle 140, to the terminal device 130. In some embodiments, the transmission module 530 may transmit an instruction to the vehicle 140 to emit a reminding hint.

The storage module 540 may be configured to store the information relating to the vehicle sharing service. In some embodiments, the storage module 540 may store a map. In some embodiments, the storage module 540 may store vehicle information, a location area of the vehicle 140, and/or a hot region. Other modules of the processing device 112 (e.g., the acquisition module 510, the processing module 520, the transmission module 530) may access the information stored in the storage module 540.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the acquisition module 510 and the transmission module 530 may be combined as a single module which may both obtain and transmit the information relating to the vehicle sharing service. As another example, the processing module 520 may be omitted and the information may be processed by an external device.

Figure 6:
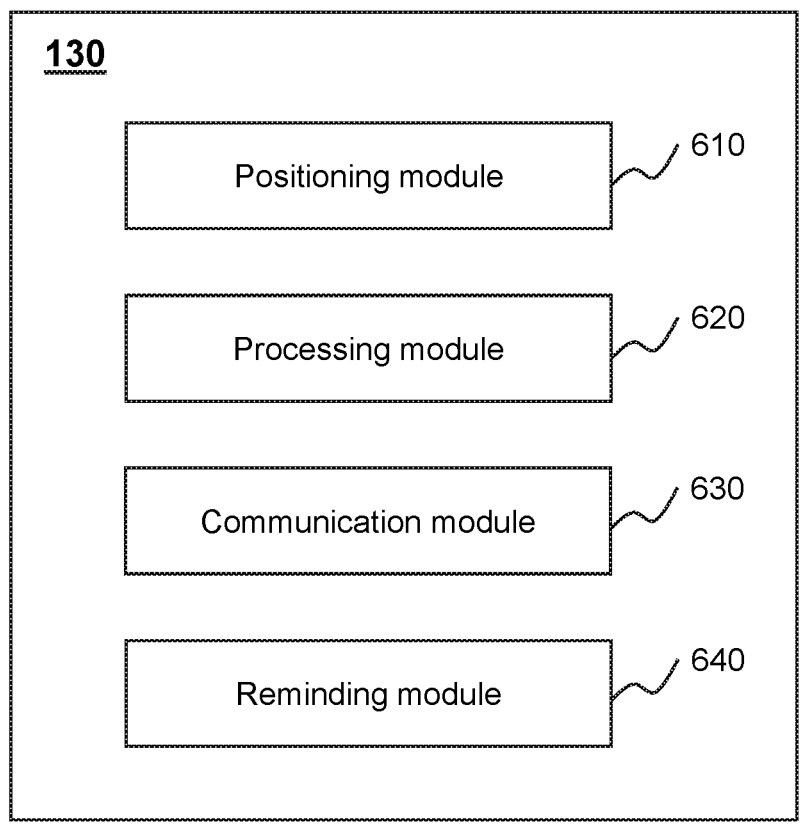
FIG. 6 is a schematic diagram illustrating an exemplary terminal device according to some embodiments of the present disclosure.
Figure 7A:
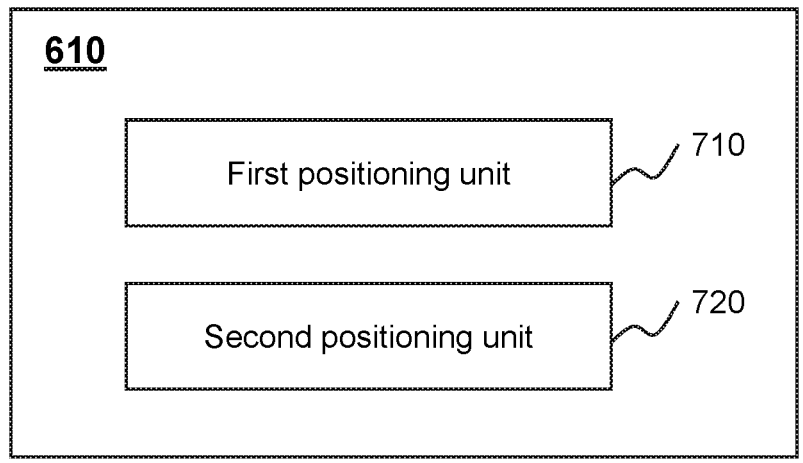
FIG. 7A is a schematic diagram illustrating an exemplary positioning module according to some embodiments of the present disclosure.
Figure 7B:
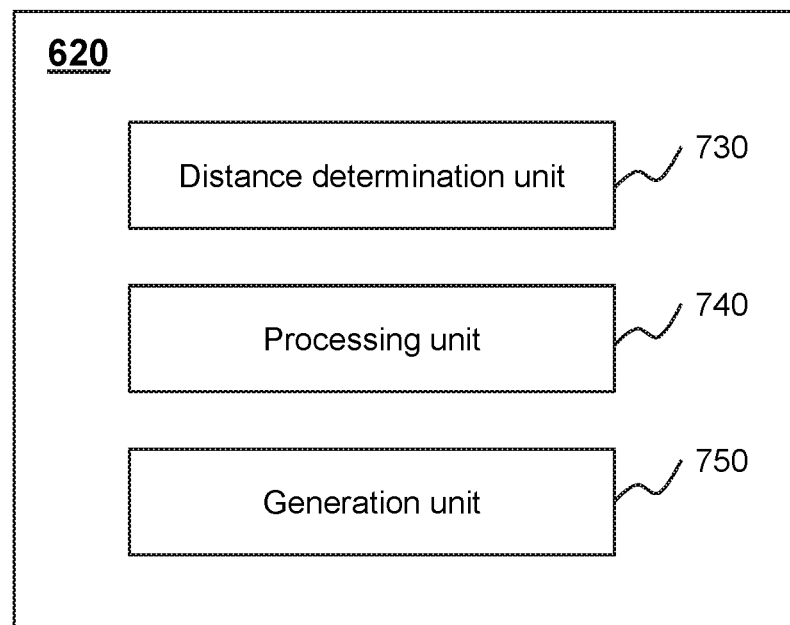
FIG. 7B is a schematic diagram illustrating an exemplary processing module according to some embodiments of the present disclosure.

FIG. 6 is a schematic diagram illustrating an exemplary terminal device according to some embodiments of the present disclosure. As shown in FIG. 6, the terminal device 130 may include a positioning module 610, a processing module 620, a communication module 630, and a reminding module 640. FIG. 7A is a schematic diagram illustrating an exemplary positioning module according to some embodiments of the present disclosure. As shown in FIG. 7A, the positioning module 610 may include a first positioning unit 710, and a second positioning unit 720. FIG. 7B is a schematic diagram illustrating an exemplary processing module according to some embodiments of the present disclosure. As shown in FIG. 7B, the processing module 620 may include a distance determination unit 730, a processing unit 740, and a generation unit 750.

The positioning module 610 may be configured to determine a location of the terminal device 130 and/or the vehicle 140. In some embodiments, the positioning module 610 may include a first positioning unit 710 and a second positioning unit 720. The first positioning unit 710 may determine a location of the terminal device 130 according to a first positioning mode. The second positioning unit 720 may determine the location of the terminal device 130 and/or the vehicle 140 (e.g., a relative location of the terminal device 130 and the vehicle 140) based on a second positioning mode.

The processing module 620 may be configured to process the information relating to the vehicle sharing service. In some embodiments, the processing module 620 may include a distance determination unit 730, a processing unit 740, and a generation unit 750. In some embodiments, the distance determination unit 730 may determine a distance (e.g., a straight-line distance or a route distance) between the vehicle 140 and the terminal device 130. For example, the distance determination unit 730 may determine the distance based on the intensity of the short-range wireless signal that the terminal device 130 receives. As another example, the distance determination unit 730 may determine the distance based on the second positioning mode. In some embodiments, the processing unit 740 may determine an intensity of the short-range wireless signal. In some embodiments, the processing unit 740 may determine a location area of the vehicle 140 based on the location of the terminal device 130 and the intensity of the short-range wireless signal. In some embodiments, the processing unit 740 may determine whether the distance between the vehicle 140 and the terminal device 130 is greater than a first threshold and/or less than a second threshold. In some embodiments, the generation unit 750 may generate a route (e.g., a first route, a second route) between the terminal device 130 and the vehicle 140. In some embodiments, the generation unit 750 may generate an arrival hint.

The communication module 630 may be configured to communicate with other components relating to the vehicle sharing service. In some embodiments, the communication module 630 may detect the short-range wireless positioning signal (e.g., the ibeacon signal) emitted from the vehicle 140. In some embodiments, the communication module 630 may establish a communication (e.g., a wireless communication) with the processing device 112, via an application installed in the terminal device 130. In some embodiments, the communication module 630 may transmit an instruction to the vehicle 140 to emit a reminding hint.

The reminding module 640 may be configured to remind the user. In some embodiments, the reminding module 640 may remind the user that the vehicle 140 is nearby. In some embodiments, the reminding module 640 may generate an arrival hint. In some embodiments, the arrival hint may include a text, an image, a sound, a voice, a cartoon, a video, or the like, or any combination thereof. For example, the application installed in the terminal device 130 may broadcast a voice of "you have arrived at the destination." As another example, a text of "arrived" may be shown on the interface of the application.

Figure 8:
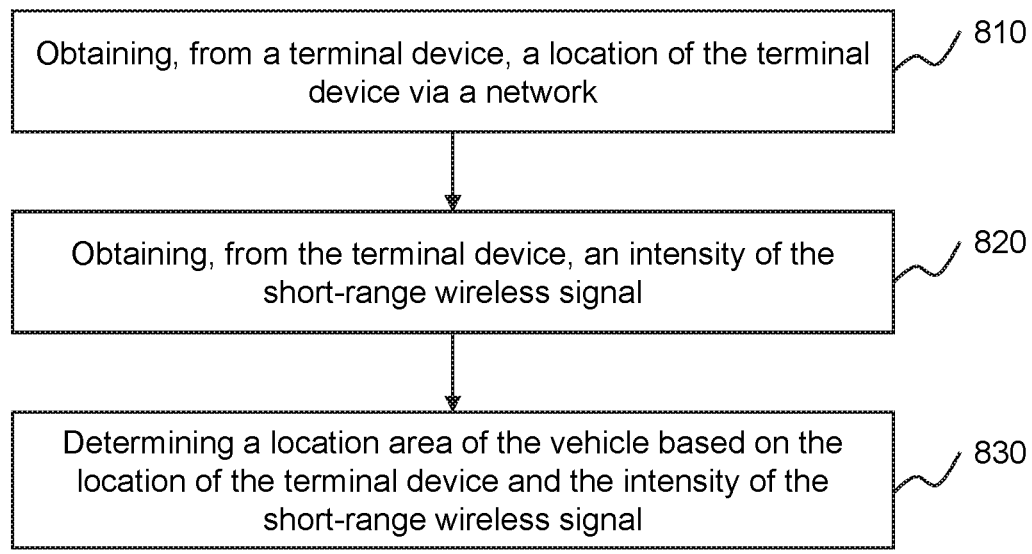
FIG. 8 is a flowchart of an exemplary process for determining a location area of a vehicle according to some embodiments of the present disclosure.

FIG. 8 is a flowchart of an exemplary process for determining a location area of a vehicle according to some embodiments of the present disclosure. The process 800 may be executed by the vehicle sharing system 100. For example, the process 800 may be implemented as a set of instructions (e.g., an application) stored in the storage ROM 230 or RAM 240. The processor 220 may execute the set of instructions, and when executing the instructions, it may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 810, the processing device 112 (e.g., the acquisition module 510) may obtain a location of a terminal device 130. In some embodiments, the processing device 112 may obtain the location of the terminal device 130 from the terminal device 130 via a network 120. In some embodiments, the location of the terminal device may be determined by the processing device 112 according to a positioning technology. The positioning technology may include a global positioning system (GPS), a global navigation satellite system (GLONASS), a compass navigation system (COMPASS), a BeiDou navigation satellite system, a Galileo positioning system, a quasi-zenith satellite system (QZSS), a WiFi positioning technology, or the like, or any combination thereof. In some embodiments, the processing device 112 may obtain the location of the terminal device 130 in real-time or substantially real-time. For example, the processing device 112 may update the location of the terminal device 130 at predetermined intervals (e.g., every 0.5, 1, 2, 3, 5, 10 seconds).

In some embodiments, the location of the terminal device 130 may be transmitted to the processing device 112 by the terminal device 130. The processing device 112 may establish a communication (e.g., a wireless communication) with the terminal device 130 via an application installed in the terminal device 130. In some embodiments, the application may be related to the on-demand service (e.g., the vehicle sharing service). The application may direct the terminal device 130 to constantly transmit the real-time location of the terminal device 130 to the processing device 112. In some embodiments, the terminal device 130 may transmit its location to the processing device 112 when the application is being used and/or running in the background.

In 820, the processing device 112 (e.g., the acquisition module 510) may obtain information associated with a vehicle from the terminal device 130. The information may include an identifier of a short-range wireless communication module of the vehicle 140 and an intensity of the short-range wireless signal determined by the terminal device 130. In some embodiments, the short-range wireless communication module may emit a short-range wireless signal. For example, the short-range wireless communication module may emit the short-range wireless signal in real-time or substantially real-time. In some embodiments, the short-range wireless communication module may be installed in/on the vehicle 140. Merely by way of example, the short-range wireless communication module may be installed in/on an electronic lock of the vehicle 140. When the terminal device 130 is near the vehicle 140 (e.g., the terminal device 130 can detect the short-range wireless signal), the terminal device 130 (e.g., the application installed in the terminal device 130) may receive the short-range wireless signal emitted from the short-range wireless communication of the vehicle 140. The terminal device 130 may obtain the identifier of the short-range wireless communication module of the vehicle 140 (which may also be referred to herein as an identifier of the vehicle 140 or a lock thereof) and determine the intensity of the short-range wireless signal based on the received short-range wireless signal. The terminal device 130 may transmit the identifier of the short-range wireless communication module of the vehicle 140 and the determined intensity of the short-range wireless signal to the processing device 112.

In some embodiments, the short-range wireless communication module may include a Bluetooth module (e.g., a Bluetooth adapter), and the short-range wireless communication module may include a Bluetooth signal. The identifier of the short-range wireless communication module may include an identifier of the Bluetooth module. In some embodiments, the identifier of the short-range wireless communication module (e.g., the Bluetooth module) may include a Bluetooth address, a media access control (MAC) address, a serial number, a mark number, a code, a barcode, a Quick Response (QR) code, a figure, or the like, or any combination thereof. With the identifier of the short-range wireless communication module of the vehicle 140, the processing device 112 may identify the vehicle 140 exclusively.

In some embodiments, the intensity of the short-range wireless signal determined by the terminal device 130 may refer to the intensity of the short-range wireless signal that the terminal device 130 receives (or determines). In some embodiments, the initial intensity of the short-range wireless signal (e.g., the intensity of the short-range wireless signal emitted from the short-range wireless communication module) may be pre-determined. For example, the initial intensity of the short-range wireless signal may be a constant value. As another example, the processing device 112 may obtain the initial intensity of the short-range wireless signal corresponding to the short-range wireless communication module. In some embodiments, the distance between the terminal device 130 and the vehicle 140 may have a negative correlation with (e.g., inversely proportional to) the intensity of the short-range wireless signal. For example, when the distance between the terminal device 130 and the vehicle 140 increases, the intensity of the short-range wireless signal may decrease. The intensity of the short-range wireless signal may be used to determine the distance between the terminal device 130 and the vehicle 140 and/or a location area of the vehicle 140.

In 830, the processing device 112 (e.g., the processing module 520) may determine a location area of the vehicle 140. In some embodiments, the processing device 112 may determine the location area of the vehicle 140 based on the location of the terminal device 130 and the intensity of the short-range wireless signal. In some embodiments, the vehicle 140 may certainly be located in the location area of the vehicle 140. Alternatively, the location area of the vehicle 140 may be a high probability (e.g., 99%, 98%, 95%) area where the vehicle 140 may be located.

In some embodiments, the location area of the vehicle 140 may be a circular region centered at the location of the terminal device 130, and the radius of the circular region may be determined based on the intensity of the short-range wireless signal. For example, when the intensity of the short-range wireless signal is changed from minimum to maximum (e.g., from a scale of 0 to 100), the radius of the location area may be changed from maximum (e.g., 50, 30, 20, 15, 10, 5 meters) to minimum (e.g., 1, 0.5, 0.3, 0.1 meters).

In some embodiments, the processing device 112 (e.g., the processing module 520) may determine the distance between the vehicle 140 and the terminal device 130 based on the intensity of the short-range wireless signal. For example, when the intensity of the short-range wireless signal is changed from minimum to maximum (e.g., from a scale of 0 to 100), the distance between the vehicle 140 and the terminal device 130 may be changed from maximum (e.g., 50, 30, 20, 15, 10, 5 meters) to minimum (e.g., 1, 0.5, 0.3, 0.1 meter). In some embodiments, the location area of the vehicle 140 may be a circular region with the location of the terminal device 130 as the center and the distance between the vehicle 140 and the terminal device 130 as a radius.

In some embodiments, the shape of the location area of the vehicle 140 may include other forms, such as a square, a rectangle, a triangle, a pentagon, a hexagon, which is not limited to the present disclosure. For example, the location area of the vehicle 140 may be a square region with the location of the terminal device 130 as the center and double of the distance between the vehicle 140 and the terminal device 130 as a side length.

In some embodiments, the location area of the vehicle 140 may be updated in some situations. For example, when the intensity of the short-range wireless signal increases, which may indicate the distance between the vehicle 140 and the terminal device 130 decreases, the location area of the vehicle 140 may be updated to a new location area (e.g., a circular region with a smaller radius). As another example, when the vehicle 140 has been moved to another place, and a new location area of the vehicle 140 differs from the old one, the location area of the vehicle 140 may be updated to a new location area. As a further example, when a new location area of the vehicle 140 is being determined by another terminal device 130 and the new location area of the vehicle 140 is more accurate (e.g., with a smaller radius) than the old one, the location area of the vehicle 140 may be updated to the new location area. In some embodiments, the location area of the vehicle 140 may be marked on a map in the application related to the vehicle 140 sharing service installed in the terminal device 130. In some embodiments, the location area of the vehicle 140 may be marked as a point, representing the center of the location area of the vehicle 140, on the map. In some embodiments, the processing device 112 (e.g., the transmission module 530) may transmit the location area of the vehicle 140 to a terminal device 130, when, for example, the application relating to the vehicle sharing service installed in the terminal device 130 is being used.

In some embodiments, the processing device 112 (e.g., the processing module 520) may obtain a map. In some embodiments, the map may be generated by the processing device 112 based, at least in part, on the intensity of the short-range wireless signal between the vehicle 140 and the terminal device 130. The processing module 520 may also mark the location area of the vehicle 140 on a map, which may be stored in a cloud or a storage device (e.g., the storage 150, the storage module 540).

In some embodiments, the processing device 112 (e.g., the acquisition module 510) may obtain a request (e.g., a vehicle usage request or an inspection request) from a requester terminal (which may be implemented using the components of the mobile device 300). The vehicle usage request may be a request to use a vehicle or make an appointment to use a vehicle. The inspection request may be a request to locate a vehicle for inspection. When receiving the request, the processing device 112 (e.g., the acquisition module 510) may obtain the location of the requester terminal, and the processing device 112 (e.g., the processing module 520) may also mark the location of the requester terminal on the map. The processing device 112 may also transmit the map to the requester terminal. In some embodiments, the map transmitted to the requester terminal may include the marking of the location area of the vehicle 140. For example, when the requester terminal is near the vehicle 140 (e.g., a distance between the vehicle 140 and the requester terminal is lower than a threshold), the processing device 112 (e.g., the transmission module 530) may transmit the map, including the markings of the location area of the vehicle 140 and the location of the requester terminal, to the requester terminal. Alternatively, the map, including the marking of the location area of the vehicle 140, may be transmitted to the requester terminal, and the requester terminal may determine its location and display the map with the marking of the location area of the vehicle 140 along with the location of the requester terminal.

In some embodiments, a plurality of location areas associated with a plurality of vehicles may be determined by performing steps 810-830. The processing device 112 (e.g., the processing module 520) may determine a hot region based on the plurality of location areas associated with the plurality of vehicles. The hot region may include more vehicles than other regions. In some embodiments, a region may be determined as a hot region if the processing device 112 determines that the number of vehicles in the region is larger than a threshold number (e.g., 3, 5, 10, 15, 20, 30, etc.). Alternatively or additionally, a region may be determined as a hot region if the processing 112 determines that the density of vehicles in the region is greater than a threshold density. For example, when a region (e.g., 10 m$^2$) includes more than 10 vehicles, the region may be determined as a hot region. In some embodiments, the hot region may be marked on a map in the application related to the vehicle sharing service. In some embodiments, the hot region may be updated in real-time or substantially real-time. For example, the hot region may be updated at predetermined intervals (e.g., every 0.5, 1, 2, 3, 5, 10, 15, 30, 60, 120, 180, 300 seconds). Alternatively or additionally, the hot region may be determined according to a condition of the vehicles in a certain time period (e.g., last 1, 2, 3, 5, 7, 15 days). The condition of the vehicles may include a changing situation of location areas associated with one vehicle 140, an accumulated amount of vehicles in a certain region, an average number of vehicles in the certain region, or the like, or any combination thereof. In some embodiments, the processing device 112 (e.g., the transmission module 530) may transmit information of the hot region to a user (e.g., a terminal device 130) when, for example, the user transmits a request (e.g., a vehicle using request, an examination request of the vehicles) to the processing device 112 via the terminal device 130.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 800. In the storing step, the processing device 112 may store the vehicle information, the location area of the vehicle 140, and/or the hot region in a storage device (e.g., the storage 150, the storage module 540) disclosed elsewhere in the present disclosure.

Figure 9:
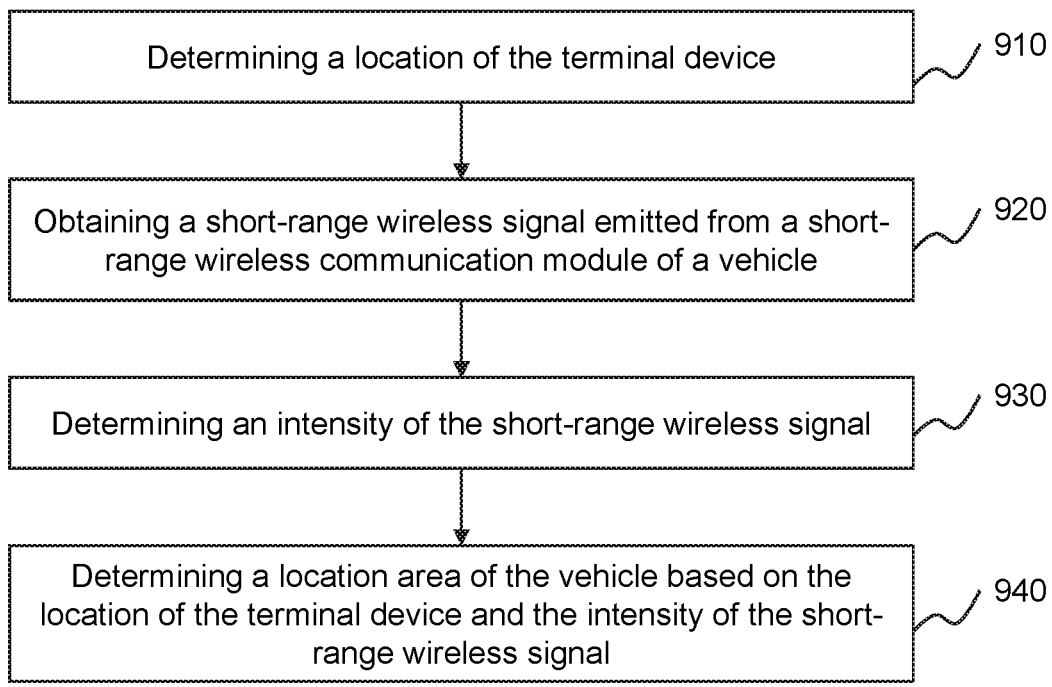
FIG. 9 is a flowchart of an exemplary process for determining a location area of a vehicle by a terminal device according to some embodiments of the present disclosure.

FIG. 9 is a flowchart of an exemplary process for determining a location area of a vehicle by a terminal device according to some embodiments of the present disclosure.

The process 900 may be executed by a terminal device 130 (e.g., the mobile device 300). For example, the process 900 may be implemented as a set of instructions stored in the storage 390. The processor 340 may execute the set of instructions, and when executing the instructions, it may be configured to perform the process 900. Merely by way of example, the process 900 may be executed via an application installed in the terminal device 130. In some embodiments, the application may be related to the on-demand service (e.g., the vehicle 140 sharing service).

In 910, the terminal device 130 (e.g., the positioning module 610) may determine a location of the terminal device 130. In some embodiments, the location of the terminal device 130 may be determined according to a positioning technology. The positioning technology may include a global positioning system (GPS), a global navigation satellite system (GLONASS), a compass navigation system (COMPASS), a BeiDou navigation satellite system, a Galileo positioning system, a quasi-zenith satellite system (QZSS), a WiFi positioning technology, or the like, or any combination thereof. In some embodiments, the terminal device 130 may obtain the location of the terminal device 130 in real-time or substantially real-time. For example, the terminal device 130 may update the location of the terminal device 130 at predetermined intervals (e.g., every 0.5, 1, 2, 3, 5, 10 seconds) or continuously.

In 920, the terminal device 130 may obtain or detect a short-range wireless signal emitted from a short-range wireless communication module of a vehicle 140. The short-range wireless signal may include an identifier of the short-range wireless communication module of the vehicle 140. In some embodiments, the short-range wireless communication module may be installed in/on or attached to the vehicle 140. Merely by way of example, the short-range wireless communication module may be installed in/on an electronic lock of the vehicle 140. More descriptions regarding the short-range wireless signal and the short-range wireless communication module may be found elsewhere in the present disclosure (e.g., FIG. 8 and the descriptions thereof).

In 930, the terminal device 130 (e.g., the processing unit 740 of the processing module 620) may determine an intensity of the short-range wireless signal. The intensity of the short-range wireless signal may be the intensity of the short-range wireless signal that the terminal device 130 receives or detects. More descriptions regarding the intensity of the short-range wireless signal may be found elsewhere in the present disclosure (e.g., FIG. 8 and the descriptions thereof).

In 940, the terminal device 130 (e.g., the processing unit 740 of the processing module 620) may determine a location area of the vehicle 140 based on the location of the terminal device 130 and the intensity of the short-range wireless signal. In some embodiments, the location area of the vehicle 140 may be a circular region centered on the location of the terminal device 130, and the radius of the circular region may be determined based on the intensity of the short-range wireless signal. In some embodiments, the terminal device 130 (e.g., the distance determination unit 730 of the processing module 620) may determine the distance between the vehicle 140 and the terminal device 130 based on the intensity of the short-range wireless signal. The location area of the vehicle 140 may be determined based on the location of the terminal device 130 and the distance between the vehicle 140 and the terminal device 130. In some embodiments, the location area of the vehicle 140 may be a circular region with the location of the terminal device 130 as a center and the distance between the vehicle 140 and the terminal device 130 as a radius. More descriptions regarding the location area of the vehicle 140 may be found elsewhere in the present disclosure (e.g., FIG. 8 and the descriptions thereof).

Figure 10:
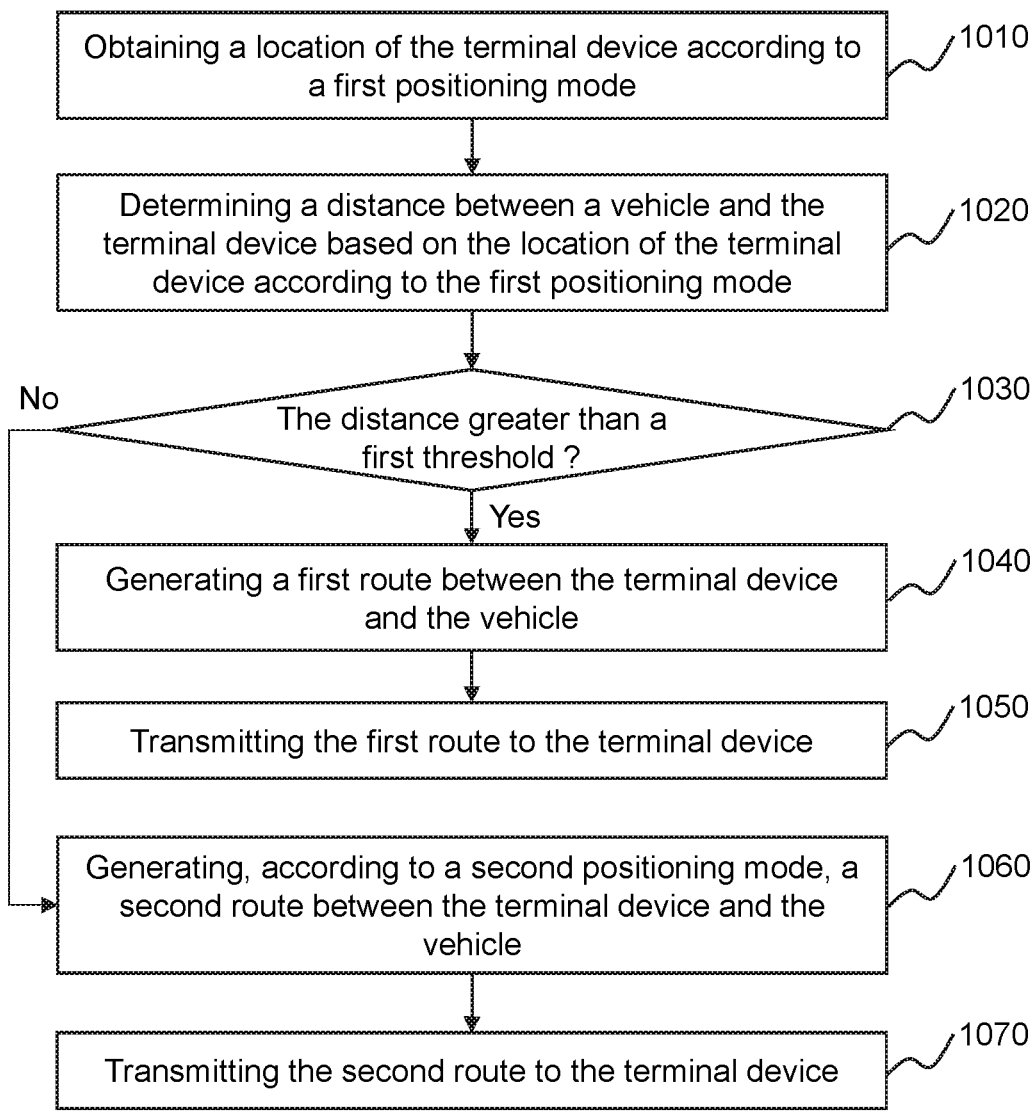
FIG. 10 is a flowchart of an exemplary process for guiding a user to locate a vehicle according to some embodiments of the present disclosure.

FIG. 10 is a flowchart of an exemplary process for guiding a user to locate a vehicle according to some embodiments of the present disclosure. The process 1000 may be executed by the vehicle sharing system 100. For example, the process 1000 may be implemented as a set of instructions (e.g., an application) stored in the storage ROM 230 or RAM 240. The processor 220 may execute the set of instructions, and when executing the instructions, it may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1010, the processing device 112 (e.g., the acquisition module 510) may obtain a location of a terminal device 130 according to a first positioning mode. The first positioning mode may be a positioning method based on a first positioning technology. In some embodiments, the first positioning technology may include a global positioning system (GPS), a global navigation satellite system (GLONASS), a BeiDou navigation system, or the like, or any combination thereof. In some embodiments, the terminal device 130 may transmit its location to the processing device 112. In some embodiments, because of a positioning accuracy of the first positioning mode (e.g., 3 m, 5 m, 8 m, 10 m, 15 m, 20 m), the processing device 112 may obtain a location area (instead of the location) of the terminal device 130. The location of the terminal device 130 may be designated as the center of the location area of the terminal device 130. In some embodiments, the processing device 112 may obtain the location of the terminal device 130 in real-time or substantially real-time. For example, the processing device 112 may update the location of the terminal device 130 at predetermined intervals (e.g., every 0.1, 0.3, 0.5, 1, 2, 3, 5, or 10 seconds).

In some embodiments, the terminal device 130 may establish a communication (e.g., a wireless communication) with the processing device 112, via an application installed in the terminal device 130. The application may relate to the on-demand service (e.g., the vehicle sharing device). In some embodiments, a user of the terminal device 130, intending to use the vehicle sharing device, may input a service request through an interface of the application installed in the terminal device 130. The terminal device 130 may transmit the service request to the processing device 112. When the processing device 112 receives the service request from the user, the processing device 112 may obtain the location of the terminal device 130 in 1010. When receiving the location of the terminal device 130, the processing device 112 may allocate a vehicle 140 (e.g., a vehicle nearest to the terminal device 130) to the user. After allocating the vehicle 140 to the user, the processing device 112 may guide the user to locate the vehicle 140 by performing 1020-1070.

In 1020, the processing device 112 (e.g., the processing module 520) may determine a distance (e.g., a straight-line distance or a route distance) between the vehicle 140 and the terminal device 130 (or the user). In some embodiments, the distance may be determined based on the location of the terminal device 130 and the location of the vehicle 140. In some embodiments, the location of the vehicle 140 may be the center of a location area (e.g., the location area illustrated in FIG. 8 and the related description) of the vehicle 140. In some embodiments, the distance between the vehicle 140 and the terminal device 130 may be determined based on a map. For example, the distance may be determined by calculating the length of a straight line (or a route) between the location of the terminal device 130 and the location of the vehicle 140 on the map.

In 1030, the processing device 112 (e.g., the processing module 520) may determine whether the distance between the vehicle 140 and the terminal device 130 is greater than a first threshold. In some embodiments, the first threshold may be a predetermined value between 5 to 50 meters. For example, the first threshold may be 5, 8, 10, 15, 20, 25, 30, or 50 meters. In some embodiments, the first threshold may be changed according to different situations. Generally, when the distance between the vehicle 140 and the terminal device 130 is less than the first threshold, the terminal device 130 may detect the short-range wireless signal emitted from the vehicle 140. For example, when an emitting range (e.g., the largest detectable distance) of the short-range wireless signal is 30 meters, the first threshold may be designated as 25 meters. If the processing device 112 determines that the distance between the vehicle 140 and the terminal device 130 is greater than the first threshold, the process 1000 may proceed to 1040. If the processing device 112 determines that the distance between the vehicle 140 and the terminal device 130 is not greater than the first threshold, the process 1000 may proceed to 1060.

In 1040, the processing device 112 (e.g., the processing module 520) may generate a first route between the terminal device 130 and the vehicle 140. In some embodiments, the first route may be a walking route from a start point to an end point. The start point may be the location of the terminal device 130. The end point may be the location of the vehicle 140. In some embodiments, when the terminal device 130 (e.g., the user) is in a place (e.g., a building, a house) that the first route can hardly be generated, the start point may be designated as a location near the place (e.g., an exit of the building, a gate of the house).

In 1050, the processing device 112 (e.g., the transmission module 530) may transmit the first route to the terminal device 130. In some embodiments, the first route may be displayed or highlighted on a map in the application related to the vehicle 140 sharing service installed in the terminal device 130. The first route may be used to guide the user to locate the vehicle 140. In some embodiments, the first route may be updated in real-time or substantially real-time. For example, the processing device 112 may update the first route at predetermined intervals (e.g., every 0.1, 0.3, 0.5, 1, 2, 3, 5, or 10 seconds) or continuously.

In 1060, the processing device 112 (e.g., the processing module 520) may generate a second route between the terminal device 130 and the vehicle 140 according to a second positioning mode. In some embodiments, a positioning accuracy of the second positioning mode may be higher than that of the first positioning mode. In some embodiments, the second positioning mode may be a positioning method based on a second positioning technology (e.g., a short-range wireless positioning technology). For example, the second positioning mode may be an ibeacon positioning mode. The ibeacon positioning mode may be operated based on a Bluetooth low energy (BLE) technology. In some embodiments, the ibeacon positioning mode may include a received signal strength positioning method, an arrived time positioning method, a received signal angle positioning method, a reference point positioning method, or the like, or any combination thereof. In the received signal strength positioning method, the intensity of the ibeacon signal may be expressed by a received signal strength indication (RSSI) value. The RSSI value may be changed corresponding to the change of the distance between the vehicle 140 (a signal source) and the terminal device 130 (a signal receiver). The location of the terminal device 130 and/or the distance between the vehicle 140 and the terminal device 130 may be determined based on the RSSI value and/or the changes of the RSSI value. In some embodiments, if the processing device 112 determines that the distance between the terminal device 130 and the vehicle 140 is approximately equal to or less than the first threshold, a module corresponding to the second positioning mode in the terminal device 130 may be activated. For example, if the processing device 112 determines that the distance between the terminal device 130 and the vehicle 140 is equal to or less than the first threshold, the communication module 630 may be activated to detect the short-range wireless positioning signal (e.g., the ibeacon signal) emitted from the vehicle 140.

In some embodiments, the location of the terminal device 130 and the location of the vehicle 140 may be re-determined according to the second positioning mode. The positioning accuracy of the re-determined location of the terminal device 130 and the re-determined location of the vehicle 140 may be higher than that under the first positioning mode. The second route may be determined based on the re-determined location of the terminal device 130 and the vehicle 140.

In some embodiments, a relative location of the vehicle 140 with respect to the terminal device 130 may be determined according to the second positioning mode. For example, the relative location of the vehicle 140 with respect to the terminal device 130 may be determined based on a change of the distance between the terminal device 130 and the vehicle 140 corresponding to a movement of the terminal device 130. The second route may be determined based on the relative location of the vehicle 140 with respect to the terminal device 130.

In some embodiments, when the processing device 112 determines that the distance between the vehicle 140 and the terminal device 130 is less than or equal to the first threshold and the second positioning mode can be performed (e.g., the terminal device 130 can detect the short-range wireless signal emitted from the vehicle 140), the processing device 112 may generate the second route. In some embodiments, when the distance between the vehicle 140 and the terminal device 130 is less than or equal to the first threshold but the terminal device 130 cannot detect the short-range wireless signal emitted from the vehicle 140, the user may walk to locate the vehicle 140 continually according to the first route till the terminal device 130 can detect the short-range wireless signal.

In some embodiments, when the terminal device 130 can detect the short-range wireless signal, the processing device 112 determines that the distance between the vehicle 140 and the terminal device 130 is larger than the first threshold, the user may choose (or predetermine) which of the first route and the second route is preferred. In some embodiments, the user may choose through a user interface of the application installed in the terminal device 130. For example, the user may press a button on the interface of the application to choose the first route or second route. In some embodiments, the choice may be predetermined by the user. When the user chooses the first route, the user may walk to locate the vehicle 140 continually according to the first route till the distance between the vehicle 140 and the terminal device 130 is less than or equal to the first threshold. When the user chooses the second route, the second route may be generated by the processing device 112.

In 1070, the processing device 112 (e.g., the transmission module 530) may transmit the second route to the terminal device 130. In some embodiments, the second route may be shown on a map in the application related to the vehicle sharing service installed in the terminal device 130. The second route may be used to guide the user to locate the vehicle 140. In some embodiments, the second route may be updated in real-time or substantially real-time. For example, the processing device 112 may update the second route at predetermined intervals (e.g., every 0.1, 0.3, 0.5, 1, 2, 3, 5, or 10 seconds) or continuously.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, when receiving the location of the terminal device 130, the distance between the vehicle 140 and the terminal device 130 has already been less than the first threshold, the step 1040 and 1050 may be omitted. As another example, when the user locates the vehicle 140 before the second route is generated, the user may perform a confirmation operation (e.g., press a button on the interface of the application) to stop executing the process 1000.

Figure 11:
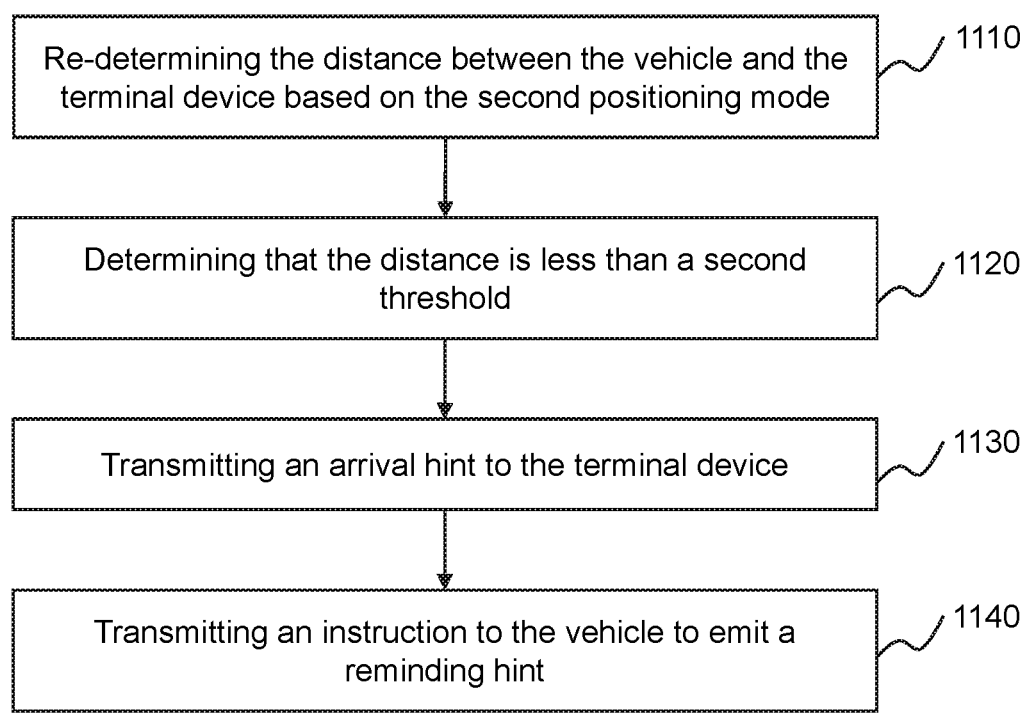
FIG. 11 is a flowchart of an exemplary process for locating a vehicle according to some embodiments of the present disclosure.

FIG. 11 is a flowchart of an exemplary process for locating a vehicle according to some embodiments of the present disclosure. The process 1100 may be executed by the vehicle sharing system 100. For example, the process 1100 may be implemented as a set of instructions (e.g., an application) stored in the storage ROM 230 or RAM 240. The processor 220 may execute the set of instructions, and when executing the instructions, it may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

In 1110, the processing device 112 (e.g., the processing module 520) may re-determine the distance between the vehicle 140 and the terminal device 130 based on the second positioning mode. In some embodiments, the second positioning mode may be a positioning mode having a better positioning accuracy than the first positioning mode. In some embodiments, the second positioning mode may be a positioning method based on a second positioning technology (e.g., a short-range wireless positioning technology). For example, the second positioning mode may be an ibeacon positioning mode. More descriptions regarding the second positioning mode may be found elsewhere in the present disclosure (e.g., FIG. 10 and the descriptions thereof).

In some embodiments, the distance between the vehicle 140 and the terminal device 130 may be re-determined based on the re-determined location of the terminal device 130 and the re-determined location of the vehicle 140 according to the second positioning mode. In some embodiments, the distance between the vehicle 140 and the terminal device 130 may be re-determined based on the short-range wireless signal (e.g., the ibeacon signal) emitted from the vehicle 140. For example, the distance may be re-determined based on the intensity of the short-range wireless signal that the terminal device 130 detects.

In 1120, the processing device 112 (e.g., the processing module 520) may determine whether the distance (e.g., the re-determined distance) between the vehicle 140 and the terminal device 130 is equal to or less than a second threshold. When the distance between the vehicle 140 and the terminal device 130 is less than the second threshold, the process 1100 may proceed to 1120. In some embodiments, the second threshold may be less than the first threshold. In some embodiments, the second threshold may be a predetermined distance between 1-15 meters. For example, the second threshold may be 1, 2, 3, 5, 8, 10, or 15 meters. The second threshold may be changed according to different situations (e.g., different jam conditions of the surroundings). In some embodiments, when the distance between the terminal device 130 and the vehicle 140 is less than the second threshold, the vehicle 140 may be in the sight of the user.

In 1130, the processing device 112 (e.g., the transmission module 530) may transmit an arrival hint to the terminal device 130. In some embodiments, the arrival hint may be transmitted to the terminal device 130 (e.g., the reminding module 640) to remind the user that the vehicle 140 is nearby. In some embodiments, the arrival hint may include a text, an image, a sound, a voice, a cartoon, a video, or the like, or any combination thereof. For example, the application installed in the terminal device 130 may broadcast a voice of "you have arrived at the destination." Alternatively or additionally, a text of "arrived" may be shown on the interface of the application.

In 1140, the processing device 112 (e.g., the transmission module 530) may transmit an instruction to the vehicle 140 to emit a reminding hint. In some embodiments, the processing device 112 may transmit the instruction to the vehicle 140 when the distance between the vehicle 140 and the terminal is less than the second threshold. In some embodiments, the processing device 112 may receive a locating instruction from the terminal device 130. For example, when the user arrives at a location near the vehicle 140, but there are more than one vehicles nearby, and the user cannot recognize which one is the vehicle to which he/she is assigned, the user may transmit a locating instruction associated with the vehicle 140 to the processing device 112. When receiving the locating instruction from the terminal device 130, the processing device 112 may transmit the instruction to the vehicle 140.

In some embodiments, the communication component 440 of the vehicle 140 may receive the instruction. When received the instruction, the vehicle 140 (e.g., a reminding module installed in/on the vehicle 140) may emit a hint or alert. The hint or alert may include a light, a sound, a vibration of an object on the vehicle, or the like, or any combination thereof. With the hint or alert, the user may locate the vehicle 140 easier.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, if the vehicle 140, in a certain condition, can be found without the hint emitted from the vehicle 140, the step 1140 may be omitted.

Figure 12:
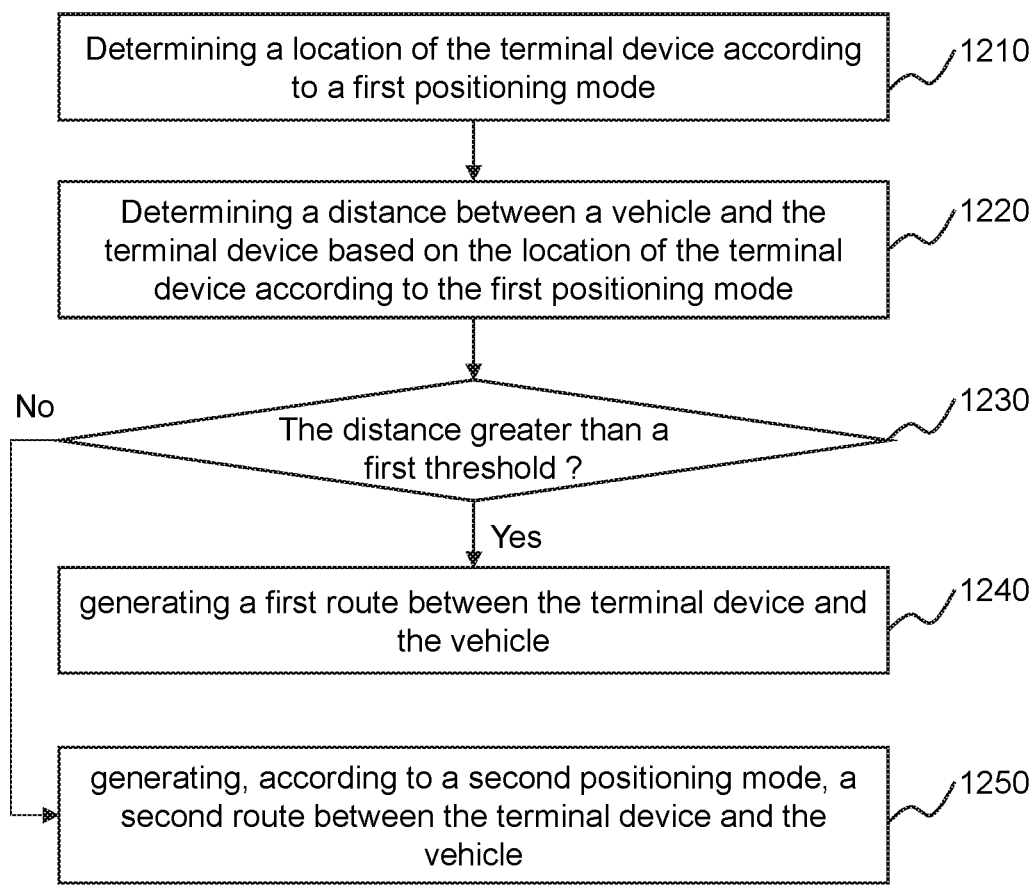
FIG. 12 is a flowchart of an exemplary process for guiding a user to locating a vehicle according to some embodiments of the present disclosure.

FIG. 12 is a flowchart of an exemplary process for guiding a user to locate a vehicle according to some embodiments of the present disclosure. The process 1200 may be executed by a terminal device 130 (e.g., the mobile device 300). For example, the process 1200 may be implemented as a set of instructions stored in the storage 390. The processor 340 may execute the set of instructions, and when executing the instructions, it may be configured to perform the process 1200. Merely by way of example, the process 1200 may be executed via an application installed on the terminal device 130. In some embodiments, the application may be related to the on-demand service (e.g., the vehicle sharing service).

In 1210, the terminal device 130 (e.g., the first positioning unit 710 of the positioning module 610) may determine a location of the terminal device 130 according to a first positioning mode. The first positioning mode may be a positioning method based on a first positioning technology. In some embodiments, the first positioning technology may include a global positioning system (GPS), a global navigation satellite system (GLONASS), a BeiDou navigation system, or the like, or any combination thereof. In some embodiments, because of a positioning accuracy of the first positioning mode (e.g., 3 m, 5 m, 8 m, 10 m, 15 m, 20 m), the terminal device 130 may obtain a location area of the terminal device 130. The location of the terminal device 130 may be designated as the center of the location area of the terminal device 130. In some embodiments, the terminal device 130 may obtain the location of the terminal device 130 in real-time or substantially real-time. For example, the terminal device 130 may update the location of the terminal device 130 at predetermined intervals (e.g., every 0.1, 0.3, 0.5, 1, 2, 3, 5, or 10 seconds) or continuously.

In some embodiments, the terminal device 130 (e.g., the communication module 630) may establish a communication (e.g., a wireless communication) with the processing device 112, via an application installed in the terminal device 130. The application may relate to the on-demand service (e.g., the vehicle sharing device). In some embodiments, a user of the terminal device 130, intending to use the vehicle sharing device, may input a service request through an interface of the application installed in the terminal device 130 and transmit the service request to the processing device 112. When the processing device 112 receives the service request from the user, the processing device 112 may obtain the location of the terminal device 130 in 1210. When receives the location of the terminal device 130, the processing device 112 may allocate a vehicle 140 (e.g., a vehicle nearest to the terminal device 130) to the user. After allocating the vehicle 140 to the user, the terminal device 130 may guide the user to locate the vehicle 140 by performing 1220-1250.

In 1220, the terminal device 130 (e.g., the distance determination unit 730 of the processing module 620) may determine a distance (e.g., a straight-line distance or a route distance) between a vehicle 140 and the terminal device 130 (or the user). In some embodiments, the distance may be determined based on the location of the terminal device 130 and the location of the vehicle 140. In some embodiments, the location of the vehicle 140 may be the center of a location area (e.g., the location area illustrated in FIG. 8 and the related description) of the vehicle 140. In some embodiments, the distance between the vehicle 140 and the terminal device 130 may be determined based on a map of the application installed in the terminal device 130. For example, the distance may be determined by calculating the length of a straight line (or a route) between the location of the terminal device 130 and the location of the vehicle 140 on the map.

In 1230, the terminal device 130 (e.g., the processing unit 740 of the processing module 620) may determine whether the distance between the vehicle 140 and the terminal device 130 is greater than a first threshold. In some embodiments, the first threshold may be any value in a range of 5 to 50 meters. For example, the first threshold may be 5, 8, 10, 15, 20, 25, 30, or 50 meters. In some embodiments, the first threshold may be changed according to different situations. Generally, when the distance between the vehicle 140 and the terminal device 130 is less than the first threshold, the terminal device 130 may detect the short-range wireless signal emitted from the vehicle 140. For example, when an emission range (e.g., the largest detectable distance) of the short-range wireless signal is 30 meters, the first threshold may be designated as 25 meters. If the terminal device 130 determines that the distance between the vehicle 140 and the terminal device 130 is greater than the first threshold, the process 1200 may proceed to 1240. If the terminal device 130 determines that the distance between the vehicle 140 and the terminal device 130 is not greater than the first threshold, the process 1200 may proceed to 1250.

In 1240, the terminal device 130 (e.g., the generation unit 750 of the processing module 620) may generate a first route between the terminal device 130 and the vehicle 140. In some embodiments, the first route may be a walking route from a start point to an end point. The start point may be the location of the terminal device 130. The end point may be the location of the vehicle 140. In some embodiments, when the terminal device 130 (e.g., the user) is in a place (e.g., a building, a house) that the first route can hardly be generated, the start point may be designated as a location near the place (e.g., an exit of the building, a gate of the house).

In 1250, the terminal device 130 (e.g., the generation unit 750 of the processing module 620) may generate, according to a second positioning mode, a second route between the terminal device 130 and the vehicle 140. In some embodiments, a positioning accuracy of the second positioning mode may be higher than that of the first positioning mode. In some embodiments, the second positioning mode may be a positioning method based on a second positioning technology (e.g., a short-range wireless positioning technology). For example, the second positioning mode may be an ibeacon positioning mode. More descriptions regarding the second positioning mode may be found elsewhere in the present disclosure (e.g., FIG. 10 and the descriptions thereof).

In some embodiments, the terminal device 130 (e.g., the distance determination unit 730 of the processing module 620) may re-determine the distance between the vehicle 140 and the terminal device 130 based on the second positioning mode. In some embodiments, the terminal device 130 (e.g. the second positioning unit 720 of the positioning module 610) may re-determine the location of the terminal device 130 and/or the vehicle 140 (e.g., a relative location of the terminal device 130 and the vehicle 140) based on the second positioning mode. The distance between the vehicle 140 and the terminal device 130 may be re-determined based on the re-determined location of the terminal device 130 and the re-determined location of the vehicle 140. In some embodiments, the distance between the vehicle 140 and the terminal device 130 may be re-determined based on the short-range wireless signal (e.g., the ibeacon signal) emitted from the vehicle 140. For example, the distance may be re-determined based on the intensity of the short-range wireless signal that the terminal device 130 detects.

In some embodiments, the terminal device 130 (e.g., the processing unit 740 of the processing module 620) may determine whether the distance (e.g., the re-determined distance) between the vehicle 140 and the terminal device 130 is equal to or less than a second threshold. In some embodiments, the second threshold may be less than the first threshold. More descriptions regarding the second threshold may be found elsewhere in the present disclosure (e.g., FIG. 11 and the descriptions thereof).

In some embodiments, the terminal device 130 (e.g., the reminding module 640) may generate an arrival hint. In some embodiments, the arrival hint may be used to remind the user that the vehicle 140 is nearby. In some embodiments, the arrival hint may include a text, an image, a sound, a voice, a cartoon, a video, or the like, or any combination thereof. For example, the application installed in the terminal device 130 may broadcast a voice of "you have arrived at the destination." Alternatively or additionally, a text of "arrived" may be shown on the interface of the application.

In some embodiments, the terminal device 130 (e.g., the communication module 630) may transmit an instruction to the vehicle 140 to produce a reminding hint. In some embodiments, the terminal device 130 may transmit the instruction to the vehicle 140 when the distance between the vehicle 140 and the terminal is less than the second threshold. For example, when the user arrives at a location near the vehicle 140, but there are more than one vehicles nearby, and the user cannot recognize which one is the vehicle to which he/she is assigned, the user may transmit the instruction to the vehicle 140 via the terminal device 130. The communication component 440 of the vehicle 140 may receive the instruction. When receiving the instruction, the vehicle 140 (e.g., a reminding module installed in/on the vehicle 140) may generate and emit a reminding hint or alert. The reminding hint or alert may include a light, a sound, a vibration of an object on the vehicle, or the like, or any combination thereof. With the reminding hint or alert emitted from the vehicle 140, the user may locate the vehicle 140 easier.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, when obtaining the location of the terminal device 130, the distance between the vehicle 140 and the terminal device 130 has already been less than the first threshold, the step 1240 may be omitted. As another example, when the user locates the vehicle 140 before the second route is generated, the user may perform a confirmation operation (e.g., press a button on the interface of the application) to stop executing the process 1200.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A system comprising:
a storage device storing a set of instructions;
one or more processors in communication with the storage device, wherein when executing the set of instructions, the one or more processors are configured to cause the system to:
obtain, from a terminal device, a location of the terminal device via a network;
obtain, from the terminal device, information associated with a vehicle, the information including an identifier of a short-range wireless communication module of the vehicle, the short-range wireless communication module emitting a short-range wireless signal, the information associated with the vehicle further including an intensity of the short-range wireless signal determined by the terminal device; and
determine a location area of the vehicle based on the location of the terminal device and the intensity of the short-range wireless signal.

2. The system of claim 1, wherein to determine a location area of the vehicle, the one or more processors are configured to cause the system to:
determine a distance between the vehicle and the terminal device based on the intensity of the short-range wireless signal determined by the terminal device; and
determine the location area of the vehicle based on the location of the terminal device and the distance between the vehicle and the terminal device.

3. The system of claim 2, wherein the location area of the vehicle is a circular region with the location of the terminal device as a center and the distance between the vehicle and the terminal device as a radius.

4. The system of claim 1, wherein the one or more processors are further configured to cause the system to:
obtain a map;
mark the location area of the vehicle on the map;
obtain a request from a requester terminal;
obtain a location of the requester terminal;
mark the location of the requester terminal on the map; and
transmit the map with the mark of the location area of the vehicle and the location of the requester terminal to the requester terminal.

5. The system of claim 1, wherein the one or more processors are further configured to cause the system to:
determine a plurality of location areas associated with a plurality of vehicles; and
determine a hot region based on the plurality of location areas associated with the plurality of vehicles.

6. A system comprising:
a storage device storing a set of instructions;
one or more processors in communication with the storage device, wherein when executing the set of instructions, the one or more processors are configured to cause the system to:
obtain a location of a terminal device according to a first positioning mode;
determine a distance between a vehicle and the terminal device based on the determined location of the terminal device according to the first positioning mode;

determine whether the distance is greater than a first threshold;
in response to the determination that the distance is greater than the first threshold,
generate a first route between the terminal device and the vehicle, and
transmit the first route to the terminal device; and
in response to the determination that the distance is not greater than the first threshold,
generate, according to a second positioning mode, a second route between the terminal device and the vehicle, and
transmit the second route to the terminal device.

7. The system of claim 6, wherein a positioning accuracy of the second positioning mode is higher than that of the first positioning mode.

8. The system of claim 6, wherein the one or more processors are further configured to cause the system to:
re-determine the distance between the vehicle and the terminal device based on the second positioning mode;
determine that the distance is less than a second threshold; and
transmit an arrival hint to the terminal device, the second threshold being less than the first threshold.

9. The system of claim 8, wherein the one or more processors are further configured to cause the system to transmit an instruction to the vehicle to emit a reminding hint.

10. The system of claim 6, wherein the first positioning mode is a position mode based on at least one of: a global positioning system (GPS), a global navigation satellite system (GLONASS), or a beidou navigation system.

11. The system of claim 6, wherein the second positioning mode includes an ibeacon positioning mode.

12. The system of claim 6, wherein the one or more processors are further configured to cause the system to:
obtain, from the terminal device, the location of the terminal device via a network;
obtain, from the terminal device, information associated with the vehicle, the information including an identifier of a short-range wireless communication module of the vehicle, the short-range wireless communication module emitting a short-range wireless signal, the information associated with the vehicle further including an intensity of the short-range wireless signal determined by the terminal device; and
determine a location area of the vehicle based on the location of the terminal device and the intensity of the short-range wireless signal.

13. The system of claim 12, wherein to determine the location area of the vehicle, the one or more processors are configured to cause the system to:
determine the distance between the vehicle and the terminal device based on the intensity of the short-range wireless signal determined by the terminal device; and
determine the location area of the vehicle based on the location of the terminal device and the distance between the vehicle and the terminal device.

14. The system of claim 12, wherein the one or more processors are further configured to cause the system to:
obtain a map;
mark the location area of the vehicle on the map;
obtain a request from a requester terminal;
obtain a location of the requester terminal;
mark the location of the requester terminal on the map; and
transmit the map with the mark of the location area of the vehicle and the location of the requester terminal to the requester terminal.

15. A terminal device comprising:
a storage device storing a set of instructions;
one or more processors in communication with the storage device, wherein when executing the set of instructions, the one or more processors are configured to cause the terminal device to:
determine a location of the terminal device according to a first positioning mode;
determine a distance between a vehicle and the terminal device based on the determined location of the terminal device according to the first positioning mode;
determine whether the distance is greater than a first threshold;
in response to the determination that the distance is greater than the first threshold, generate a first route between the terminal device and the vehicle; and
in response to the determination that the distance is not greater than the first threshold, generate, according to a second positioning mode, a second route between the terminal device and the vehicle.

16. The terminal device of claim 15, wherein a positioning accuracy of the second positioning mode is higher than that of the first positioning mode.

17. The terminal device of claim 15, wherein the one or more processors are further configured to cause the terminal device to:
re-determine the distance between the vehicle and the terminal device based on the second positioning mode;
determine that the distance is less than a second threshold; and
generate an arrival hint, the second threshold being less than the first threshold.

18. The terminal device of claim 17, wherein the one or more processors are further configured to cause the terminal device to transmit an instruction to the vehicle to emit a reminding hint.

19. The terminal device of claim 15, wherein the first positioning mode is a position mode based on at least one of: a global positioning system (GPS), a global navigation satellite system (GLONASS), or a beidou navigation system.

20. The terminal device of claim 15, wherein the second positioning mode includes an ibeacon positioning mode.

* * * * *